United States Patent
Sumiyoshi et al.

(10) Patent No.: US 7,630,026 B2
(45) Date of Patent: Dec. 8, 2009

(54) PLANAR LIGHT SOURCE, DISPLAY DEVICE, PORTABLE TERMINAL DEVICE, AND RAY DIRECTION SWITCHING ELEMENT

(75) Inventors: Ken Sumiyoshi, Tokyo (JP); Teruaki Suzuki, Tokyo (JP); Fujio Okumura, Tokyo (JP); Shinichi Uehara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/010,611

(22) Filed: Jan. 28, 2008

(65) Prior Publication Data

US 2008/0205083 A1    Aug. 28, 2008

Related U.S. Application Data

(62) Division of application No. 11/134,299, filed on May 23, 2005, now Pat. No. 7,349,043.

(30) Foreign Application Priority Data

May 24, 2004 (JP) ............................. 2004-154005
Oct. 13, 2004 (JP) ............................. 2004-298571

(51) Int. Cl.
G02F 1/1335    (2006.01)

(52) U.S. Cl. ............................. 349/66; 349/62; 349/65

(58) Field of Classification Search .................. 349/62, 349/65, 66; 362/606, 607, 608
See application file for complete search history.

(56) References Cited

U.S. PATENT DOCUMENTS 3,653,138 A    4/1972    Cooper
4,021,945 A    5/1977    Sussman
4,824,216 A    4/1989    Perbet et al.
5,103,328 A    4/1992    Numao (Continued)

FOREIGN PATENT DOCUMENTS

CN    1444075 A    9/2003

(Continued)

OTHER PUBLICATIONS

"Display", May 2004, pp. 14-17.

(Continued)

*Primary Examiner*—John Heyman
(74) *Attorney, Agent, or Firm*—McGinn IP Law Group, PLLC

(57) ABSTRACT

A planar light source includes a large variable width of an irradiation angle of illumination light, a display device having a large variable width of an angle of field that uses the planar light source, a portable terminal device that uses the display device, and a ray direction switching element that is incorporated in the planar light source. A beam direction regulating element (a louver), which controls a direction of light, and a transparent and scattering switching element, which can switch the transparent state and the scattering state according to ON and OFF of an applied voltage, are provided between a backlight and a liquid crystal panel, whereby it is possible to increase a variable width of an irradiation angle of light in the planar light source and increase a variable width of an angle of field of the liquid crystal display device that uses the planar light source.

18 Claims, 14 Drawing Sheets

U.S. PATENT DOCUMENTS

| | | |
|---|---|---|
| 5,283,563 A | 2/1994 | Allen et al. |
| 5,831,698 A | 11/1998 | Depp et al. |
| 5,835,074 A | 11/1998 | Didier et al. |
| 5,854,617 A | 12/1998 | Lee et al. |
| 6,211,930 B1 | 4/2001 | Sautter et al. |
| 6,474,827 B2 * | 11/2002 | Shinohara et al. ........... 362/607 |
| 6,529,212 B2 | 3/2003 | Miller et al. |
| 6,674,060 B2 | 1/2004 | Antila |
| 7,006,173 B1 * | 2/2006 | Hiyama et al. ................ 349/96 |
| 7,349,043 B2 | 3/2008 | Sumiyoshi et al. |
| 2002/0097355 A1 | 7/2002 | Kralik et al. |
| 2003/0142257 A1 | 7/2003 | Chaudhari et al. |
| 2005/0201122 A1 | 9/2005 | Shinohara et al. |
| 2006/0221631 A1 | 10/2006 | Uehara et al. |
| 2006/0256244 A1 | 11/2006 | Jak et al. |
| 2006/0262057 A1 | 11/2006 | Sumiyoshi |
| 2006/0291243 A1 | 12/2006 | Niioka et al. |
| 2007/0030240 A1 | 2/2007 | Sumiyoshi et al. |
| 2007/0052879 A1 | 3/2007 | Uehara et al. |
| 2007/0176887 A1 | 8/2007 | Uehara et al. |
| 2007/0268427 A1 | 11/2007 | Uehara et al. |

FOREIGN PATENT DOCUMENTS

| | | |
|---|---|---|
| JP | 60-83001 | 5/1985 |
| JP | 2-49304 | 2/1990 |
| JP | 6-59287 | 3/1994 |
| JP | 9-105907 | 4/1997 |
| JP | 10-197844 | 7/1998 |
| JP | 11-142819 | 5/1999 |
| JP | 2001-256816 | 9/2001 |
| JP | 2002-189123 | 7/2002 |
| JP | 2003-48429 | 2/2003 |
| WO | WO03/021691 A1 | 3/2003 |
| WO | WO03/107130 A2 | 12/2003 |

OTHER PUBLICATIONS

State Intellectual Property Office of People's Republic of China, First Office Action, Feb. 9, 2007 (with English translation).

Japanese Office Action dated Sep. 9, 2008 with Partial English-Language Translation.

* cited by examiner

| | EMITTED LIGHT DISTRIBUTION ON THE PROJECTION SURFACE |
|---|---|
| LIQUID CRYSTAL PANEL | 40 |
| TRANSPARENT AND SCATTERING SWITCHING ELEMENT (SCATTERING STATE) | 40 |
| LOUVER | 39 |
| BACKLIGHT | 38 |

| | EMITTED LIGHT DISTRIBUTION ON THE PROJECTION SURFACE |
|---|---|
| LIQUID CRYSTAL PANEL | 39 |
| TRANSPARENT AND SCATTERING SWITCHING ELEMENT (TRANSPARENT STATE) | 39 |
| LOUVER | 39 |
| BACKLIGHT | 38 |

FIG. 9

| | EMITTED LIGHT DISTRIBUTION ON THE PROJECTION SURFACE |
|---|---|
| LIQUID CRYSTAL PANEL | 43 |
| TRANSPARENT AND SCATTERING SWITCHING ELEMENT (SCATTERING STATE) | 43 |
| LOUVER | 42 |
| BACKLIGHT | 41 |

FIG. 10

| | EMITTED LIGHT DISTRIBUTION ON THE PROJECTION SURFACE |
|---|---|
| LIQUID CRYSTAL PANEL | 42 |
| TRANSPARENT AND SCATTERING SWITCHING ELEMENT (TRANSPARENT STATE) | 42 |
| LOUVER | 42 |
| BACKLIGHT | 41 |

PIXEL ARRANGEMENT DIRECTION

DIRECTION OF REPETITION OF THE TRANSPARENT AREA AND THE ABSORPTION AREA

PLANAR LIGHT SOURCE, DISPLAY DEVICE, PORTABLE TERMINAL DEVICE, AND RAY DIRECTION SWITCHING ELEMENT

RELATED APPLICATIONS

The present Application is a Divisional Application of U.S. patent application Ser. No. 11/134,299 which was filed on May 23, 2005 now U.S. Pat. No. 7,349,043 and is incorporated by reference herein.

BACKGROUND OF THE INVENTION

1. Field of the Invention

[Technical Field]

The present invention relates to a planar light source, a display device, a portable terminal device, and a ray direction switching element, and in particular, to a planar light source that can change an irradiation angle of illumination light, a display device that can change an angle of field using the planar light source, a portable terminal device that uses the display device, and a ray direction switching element that is incorporated in the planar light source.

2. Description of the Related Art

[Background Art]

In accordance with the development of technologies in recent years, a liquid crystal display device (LCD), which is wide in an angle of field, that is, visually recognizable in a wide angle range, has been put to practical use. In addition, a portable information terminal mounted with the LCD is also widely used. In such a portable information terminal, it is desirable that the angle of field of the LCD is wide when a user looks at information displayed on the LCD with other people. On the other hand, in the portable information terminal, the user often does not want other people to peep at displayed information. In such a case, it is desirable that the angle of field of the LCD is narrow. In this way, the angle of field is required to be wide and narrow depending on a state of use of the LCD. Conventionally, LCDs meeting such a demand have been proposed.

FIGS. 24(a) and 24(b) schematically show a first conventional liquid crystal display device that is described in Japanese Patent Laid-Open No. 6-59287. FIG. 24(a) shows the liquid crystal display device at the time when a voltage is not applied thereto. FIG. 24(b) shows the liquid crystal display device at the time when a voltage is applied thereto. As shown in FIGS. 24(a) and 24(b), the first conventional liquid crystal display device includes a liquid crystal panel in which a liquid crystal material (not shown) is sealed by transparent substrates 102 and 108. A polarizing plate 101 is provided on one surface of this liquid crystal panel. On the other surface, a guest host liquid crystal cell 131, in which a liquid crystal material consisting of liquid crystal molecules 131a and elongate pigment molecules 131b are sealed by two transparent substrates 114 provided with transparent electrodes 110 on surfaces thereof, is provided. The pigment molecules 131b have a larger amount of absorption of light in a minor axis direction of the molecules than in a major axis direction thereof. When a voltage is not applied to the guest host liquid crystal cell 131, the liquid crystal molecules 131a and the elongate pigment molecules 131b are arranged to be parallel to the surfaces of the transparent substrates 114 in a longitudinal direction. When a voltage is applied to the guest host liquid crystal cell 131, the liquid crystal molecules 131a and the elongate pigment molecules 131b are arranged to be perpendicular to the surfaces of the transparent substrates 114 in the longitudinal direction. The polarizing plate 101 is provided on a surface on the opposite side of a surface opposed to the liquid crystal panel of the guest host liquid crystal cell 131.

In the first conventional liquid crystal display device constituted in this way, which is described in Japanese Patent Laid-Open No. 6-59287, light in a wide angle range passes through the liquid crystal panel to be made incident on the guest host liquid crystal cell 131. When an image is displayed at a wide angle of field, a voltage is not applied to the guest host liquid crystal cell 131 to make a light absorbing direction of the guest host liquid crystal cell 131 coincident with an absorbing direction of the polarizing plate 101, whereby the light passes through the guest host liquid crystal cell 131 directly. Consequently, it is possible to visually recognize a display screen in a wide angle range.

When an image is displayed at a narrow angle of field, when a voltage is applied to the guest host liquid crystal cell 131, the pigment molecules 131b are arranged to be perpendicular to the surfaces of the transparent substrates 114 in the longitudinal direction, and an angle of incidence of light deviates largely from a direction perpendicular to the surfaces of the transparent substrates 114. This light is absorbed by the pigment molecules 131b and does not pass through the guest host liquid crystal cell 131. Therefore, even if an angle distribution of light made incident on the display device is wide, an angle distribution of emitted light is narrowed by absorption of the guest host liquid crystal. Consequently, it is possible to reduce a size of a visually recognizable display screen.

FIG. 25 is a diagram schematically showing a second conventional liquid crystal display device that is described in Japanese Patent Laid-Open No. 10-197844. The second conventional liquid crystal display device includes a backlight 113, as shown in FIG. 25. A PDLC cell 136, in which a Polymer Dispersed Liquid Crystal (PDLC) layer 111 is sandwiched by two transparent substrates 109, is provided on the backlight 113. A polarizing plate 101 is provided on the PDLC cell 136, and a Twisted Nematic-Liquid Crystal Display (TN-LCD) is provided on the polarizing plate 101. A guest host liquid crystal cell is provided on the TN-LCD, and the polarizing plate 101 is provided on the guest host liquid crystal cell. This guest host liquid crystal cell has the same structure as the guest host liquid crystal cell that is used in the first conventional liquid crystal display device described in Japanese Patent Laid-Open No. 6-59287.

In the second conventional liquid crystal display device constituted in this way, which is described in Japanese Patent Laid-Open No. 10-197844, wide field of view display and narrow field of view display are switched by switching ON and OFF of a voltage applied to the guest host liquid crystal cell. In addition, transmission and reflection of light is switched by switching ON and OFF of a voltage applied to the PDLC cell to adjust brightness of a display screen.

Japanese Patent Laid-Open No. 11-142819 discloses a liquid crystal display device in which a condensing element consisting of a prism sheet and a light scattering element consisting of a PDLC cell are provided between a light source and a liquid crystal panel. Japanese Patent Laid-Open No. 11-142819 mentions that it is possible to switch a narrow angle of field and a wide angle of field by increasing directivity of light with the prism sheet and, then, transmitting or scattering light from the prism sheet with the PDLC cell. In addition, Japanese Patent Laid-Open No. 9-105907 discloses a similar liquid crystal display device in which an optical element consisting of a PDLC cell is provided between a light source and a liquid crystal panel.

On the other hand, conventionally, a high directivity backlight, in which an irradiation range of illumination light is fixed but directivity in a specific direction such as the front direction is improved, has been developed (see, for example, monthly magazine "Display" May 2004, pages 14 to 17). FIG. 26 is a perspective view showing a conventional high directivity backlight 213 described in the monthly magazine "Display" May 2004, pages 14 to 17. As shown in FIG. 26, in this conventional high directivity backlight 213, an LED 201 is arranged in one location where a light guide plate 202 is provided, and a linear micro-prism is arranged concentrically around the LED 201 in the light guide plate 202. A prism sheet 203, in which a prism structure is also arranged concentrically around the LED 201, is arranged on a light emission surface of the light guide plate 202. In addition, a reflection sheet 204 is arranged on a surface on the opposite side of the surface of the light guide plate 202 on which the prism sheet 203 is provided.

Exit light from the LED 201 is made incident on the light guide plate 202 and emitted radially along the surface of the light guide plate 202 by the linear micro-prism formed in the light guide plate 202. At this point, the LED 201 is arranged in one location of the light guide plate 202, and a longitudinal direction of the linear micro-prism formed in the light guide plate 202 is arranged to be substantially perpendicular to the LED 201. Thus, even if light guided through the light guide plate 202 hits the linear micro-prism, the light is not deflected in the longitudinal direction of the linear micro-prism but travels linearly and radially around the LED 201. The light emitted from the light guide plate 202 is refracted by the prism sheet 203 and deflected in a vertical direction with respect to the light emission surface of the light guide plate 202. Consequently, a high directivity backlight, in which directivity is improved two-dimensionally in a front direction, is realized.

DISCLOSURE OF THE INVENTION

Problems to Solved by the Invention

However, the conventional techniques described above has problems described below. In the liquid crystal display device described in Japanese Patent Laid-Open No. 6-59287, a difference of an amount of absorption of light is small in the minor axis direction and the major axis direction of the pigment molecules in the guest host liquid crystal cell. In other words, a pigment dichroic ratio is low. In addition, liquid crystal molecules near the transparent substrates do not stand at the time of voltage application, and the pigment molecules arranged in parallel to the transparent substrates remains. Consequently, in the guest host liquid crystal cell at the time of voltage application, efficiency of absorbing light, an incident angle of which deviates largely from the direction perpendicular to the surfaces of the transparent substrates, falls, and an angle of field at the time of the narrow field of view display increases.

In addition, in the liquid crystal display device described in Japanese Patent Laid-Open No. 10-197844, the wide field of view display and the narrow field of view display are also switched by switching ON and OFF of a voltage applied to the guest host liquid crystal. Consequently, the same problems as the liquid crystal display device described in Japanese Patent Laid-Open No. 6-59287 occur.

Moreover, in the liquid crystal display device described in Japanese Patent Laid-Open No. 11-142819, light from a light source is condensed by the prism sheet, that is, directivity of light is improved. The light with high directivity passes through the PDLC cell directly, whereby a size of a visually recognizable display screen is reduced. However, since the prism sheet does not have a sufficient effect for improving directivity of light, an angle of field at the time of the narrow field of view display increases. In other words, other people peep at displayed information.

SUMMARY OF THE INVENTION

The invention has been devised in view of such problems, and it is an object of the invention to provide a planar light source having a large variable width of an irradiation angle of illumination light, a display device having a large variable width of an angle of field that uses the planar light source, a portable terminal device that uses the display device, and a ray direction switching element that is incorporated in the planar light source.

Means for Solving the Problems

A planar light source in accordance with the invention includes: a backlight that emits light in a planar shape; a ray direction regulating element that regulates a direction of light made incident from the backlight and emits the light and in which a transparent area for transmitting light and an absorption area for absorbing light are formed alternately in a direction perpendicular to a light regulating direction thereof; and a transparent and scattering switching element that is capable of switching a state in which light made incident from the ray direction regulating element is transmitted and a state in which the light is scattered.

In the invention, the beam direction regulating element, which controls a direction of light, and the transparent and scattering switching element, which can switch the transparent and the scattering state according to ON and OFF of an applied voltage, are provided between the backlight and a liquid crystal panel, whereby it is possible to increase a variable width of an irradiation angle of light in the planar light source.

It is preferable that an emitting direction of light emitted by the backlight spreads radially in an elliptical shape with respect to a direction perpendicular to an emission surface, and the transparent area and the absorption area of the ray direction regulating element are formed alternately in a direction parallel to a long diameter direction of the ellipse.

It is preferable that an emitting direction of light emitted from the back light spreads radially in an elliptical shape with respect to a direction perpendicular to an emission surface and, in the ray direction regulating element, the transparent area and the absorption area are formed alternately in a direction parallel to a short diameter direction of the ellipse. Consequently, since an amount of light of the backlight passing through the ray direction regulating element increases, it is possible to realize a bright planar light source.

An emitting direction of light emitted by the backlight may be condensed radially in a circular shape with respect to a direction perpendicular to an emission surface. Consequently, since a loss of absorption of light by the ray direction regulating element can be reduced, it is possible to realize bright display. In addition, since directivity of the backlight is two-dimensional, it is also possible to switch the narrow field of view display and the wide field of view display concerning a direction orthogonal to the direction in which the transparent area and the absorption area of the ray direction regulating element are arranged alternately.

It is preferable that, in the transparent and scattering switching element, a polymer dispersed liquid crystal layer, in which liquid crystal molecules are dispersed in a polymer film, is sandwiched between a pair of flat electrodes, and the polymer dispersed liquid crystal layer is in a state in which the polymer dispersed liquid crystal layer transmits incident light when a voltage is applied between the flat electrodes and in a state in which the polymer dispersed liquid crystal layer scatters incident light when a voltage is not applied between the flat electrodes. Consequently, since the transparent and scattering switching element does not consume electric power in the state in which the transparent and scattering switching element scatters incident light, the electric power is allocated to a backlight light source. Thus, it is possible to improve brightness of the planar light source at the time of the scattering state.

An orientation state of the liquid crystal molecules at the time when a voltage is applied thereto may be held after the application of the voltage is stopped.

The transparent and scattering switching element and the ray direction regulating element may be formed integrally. Consequently, since the ray direction regulating element can be supported by the transparent and scattering switching element, it is possible to realize a highly stable and thin planar light source.

The transparent and scattering switching element and the ray direction regulating element may have a common substrate.

A substrate of the ray direction regulating element may be only a substrate common to the ray direction regulating element and the transparent and scattering switching element. Consequently, it is possible to further reduce thickness of the planar light source. In addition, it is preferable that an amount of light of the backlight and the transparent and scattering states of the transparent and scattering switching element can be set independently. Consequently, it is possible to set intensity and directivity of light emitted from the planar light source in various ways.

It is also possible that the transparent and scattering switching element is in the state in which the transparent and scattering switching element scatters incident light when a voltage is not applied between the flat electrodes, and in which a voltage is applied to the transparent and scattering switching element when the transparent and scattering switching element is used in the scattering state. Consequently, it is possible to increase a front luminance without significantly decreasing a luminance in an oblique direction at the time when the transparent and scattering switching element is used in the scattering state.

A display device in accordance with the invention includes: a backlight that emits light in a planar shape; a ray direction regulating element that regulates a direction of light made incident from the backlight and emits the light and in which a transparent area for transmitting light and an absorption area for absorbing light are formed alternately in a direction perpendicular to a light regulating direction thereof; a transparent and scattering switching element that is capable of switching a state in which light made incident from the ray direction regulating element is transmitted and a state in which the light is scattered; and a liquid crystal panel that displays an image using light made incident from the transparent and scattering switching element.

In the invention, the beam direction regulating element, which controls a direction of light, and the transparent and scattering switching element, which can switch the transparent and the scattering state according to ON and OFF of an applied voltage, are provided between the backlight and a liquid crystal panel, whereby it is possible to increase a variable width of an angle of field of the display device.

It is preferable that an emitting direction of light emitted by the backlight spreads radially in an elliptical shape with respect to a direction perpendicular to an emission surface and, in the ray direction regulating element, the transparent area and the absorption area are formed alternately in a direction parallel to a long diameter direction of the ellipse.

The white light source may be constituted by a blue LED and a yellow phosphor to adjust an amount of light with pulse modulation. Consequently, it is possible to control chromaticity change of the display device when an amount of light of the white light source is adjusted simultaneously with switching of transparent and scattering.

A direction in which the transparent area and the absorption area of the ray direction regulating element are formed alternately and a pixel arrangement direction of the display panel do not have to be parallel to each other. Consequently, it is possible to reduce moiré due to the ray direction regulating element and the display panel.

The display panel may be a liquid crystal panel, and the liquid crystal display panel may be a panel of a lateral electric field mode, a multi-domain vertical orientation mode, or a film compensation TN mode. Consequently, it is possible to control tone reversal and improve visibility at the time when the transparent and scattering switching element is in the scattering state.

The portable terminal device may have adjusting means that can change an amount of the backlight and the transparent and scattering states of the transparent and scattering switching element independently from each other. Consequently, a user can set an optimum state according to an environment of use of the portable terminal device.

The portable terminal device may have electric power accumulating means, residual amount detecting means for electric power accumulated in the electric power accumulating means, and control means that automatically changes an amount of the backlight and the transparent and scattering states of the transparent and scattering switching element on the basis of detected residual amount information. When the transparent and scattering element is brought into the transparent state, since an amount of light of the backlight can be reduced, it is possible to reduce power consumption when residual battery power is low and extend an operating time of the portable terminal device.

The transparent area and the absorption area of the ray direction regulating element may be formed alternately in a lateral direction of the portable terminal device. Consequently, it is possible to increase a variable width of an angle of field in the lateral direction of the portable terminal device.

A ray direction switching element in accordance with the invention is characterized in that a ray direction regulating element, which regulates a direction of incident light and emits light, and a transparent and scattering switching element, which is capable of switching a state in which light made incident from the ray direction regulating element is transmitted and a state in which the light is scattered, are integrally formed. Consequently, since the ray direction regulating element can be supported by the transparent and scattering switching element, it is possible to realize a highly stable and thin ray direction switching element.

In the ray direction switching element, the transparent and scattering switching element and the ray direction regulating element may be formed on a common substrate. A substrate of the ray direction regulating element may be only a substrate common to the ray direction regulating element and the transparent and scattering switching element.

Advantage of the Invention

According to the invention, the ray direction regulating element, that controls a direction of light, and the transparent and scattering switching element, which can switch the transparent and scattering states by turning ON and OFF an applied voltage, are provided between the backlight and the liquid crystal panel, whereby it is possible to increase a variable width of an irradiation angle of light in the planar light source and increase a variable width of an angle of field of the liquid crystal display device that uses the planar light source.

BRIEF DESCRIPTION OF THE DRAWINGS

Brief Description of the Drawings

Figure 1:
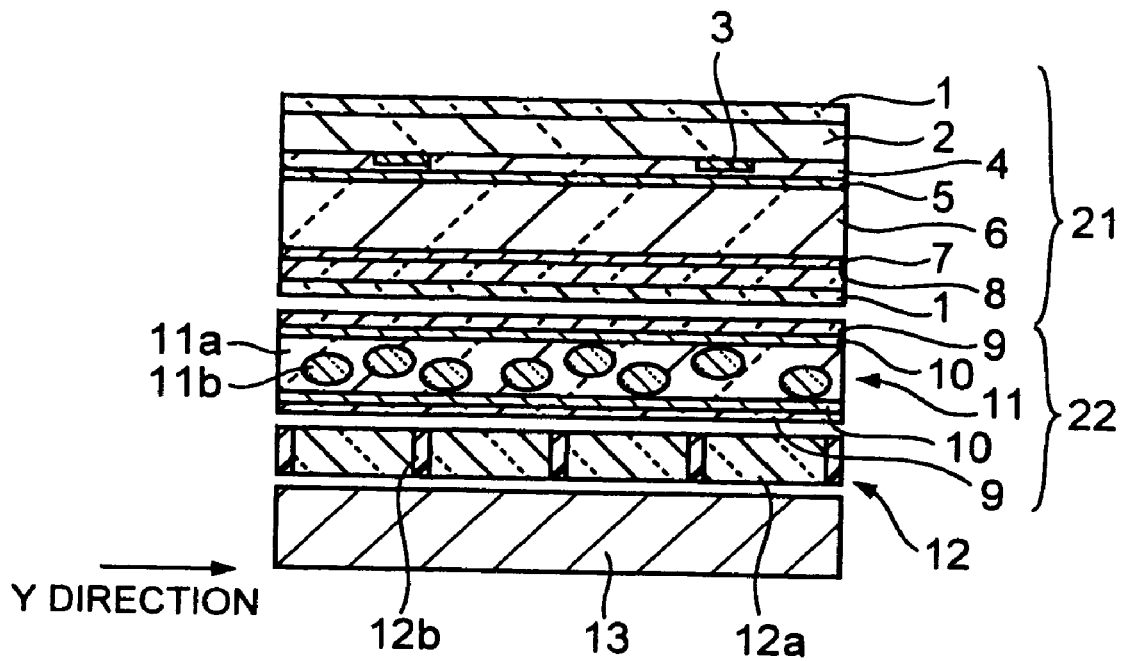
Figure 2:
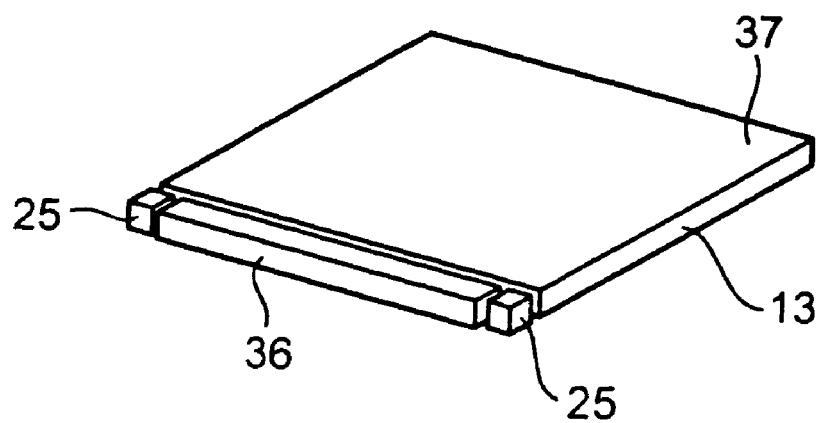
Figure 3:
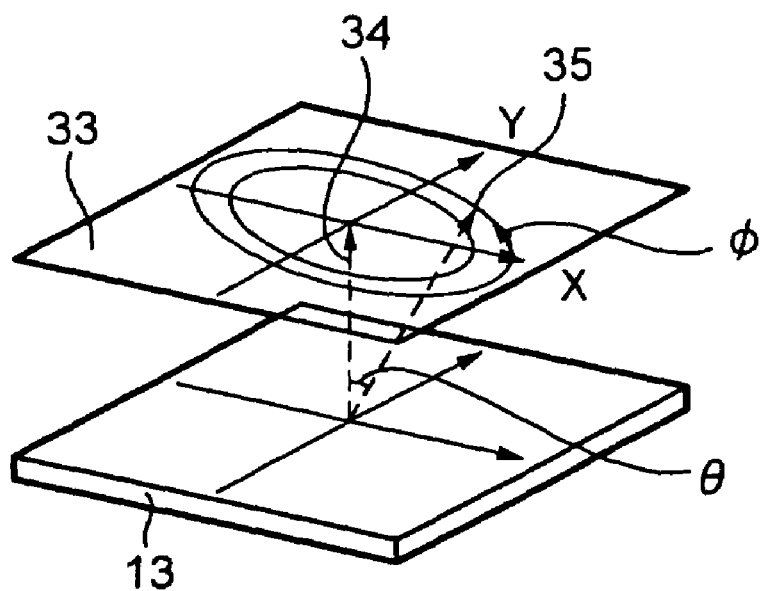
Figure 4:
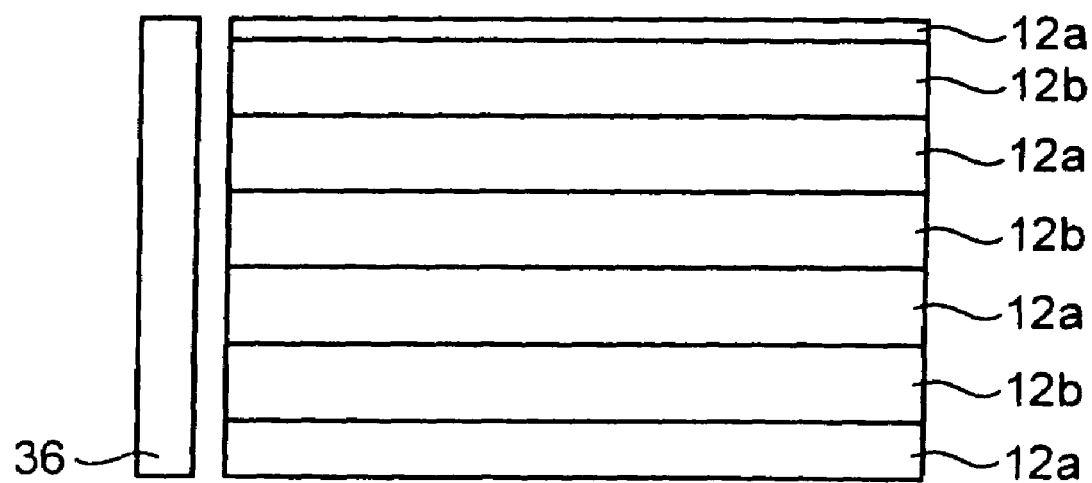
Figure 5:
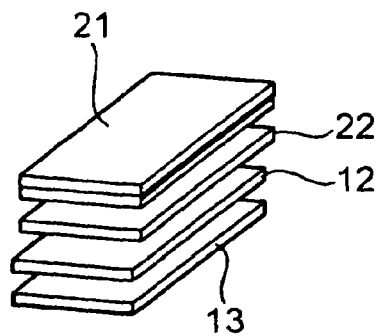
Figure 6:
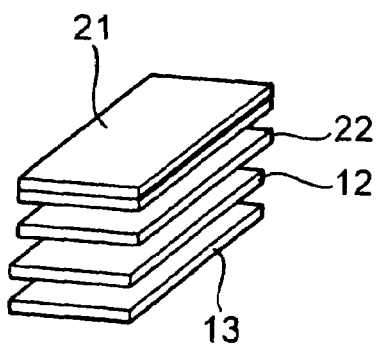
Figure 7:
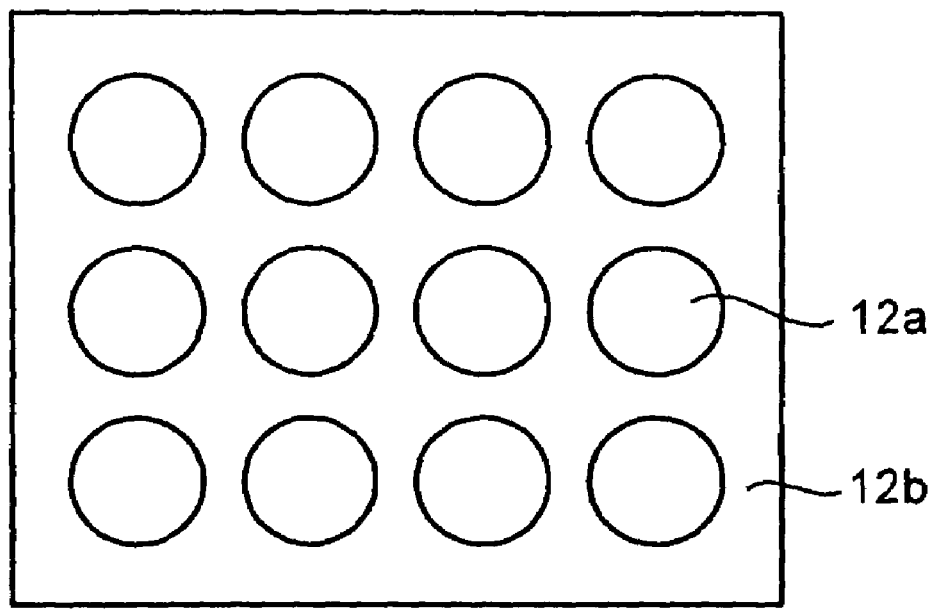
Figure 8:
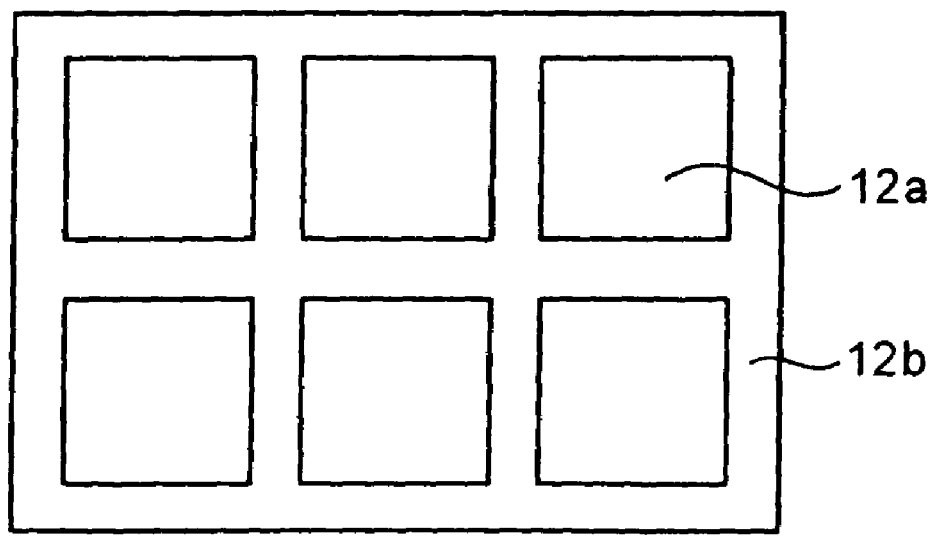
Figure 11:
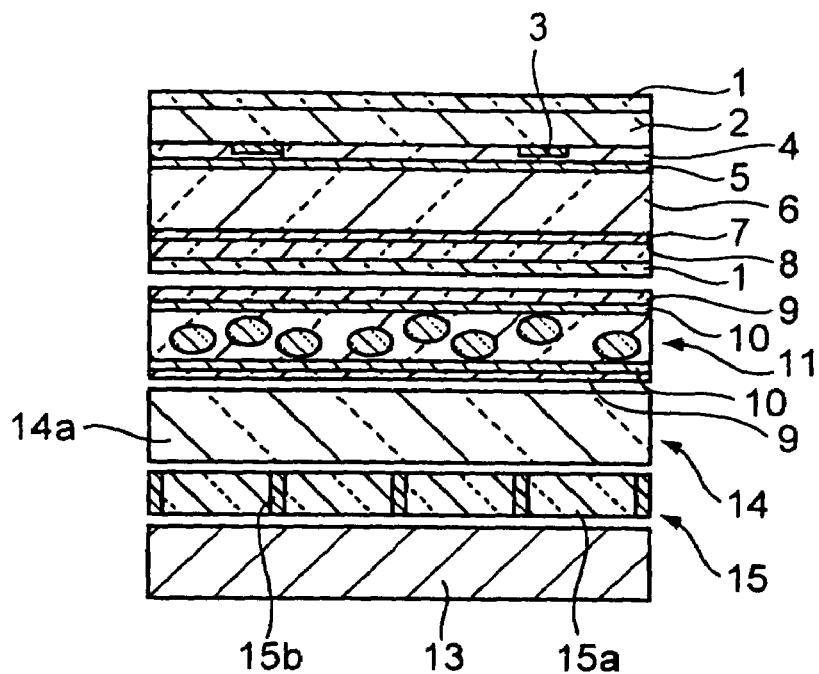
Figure 12:
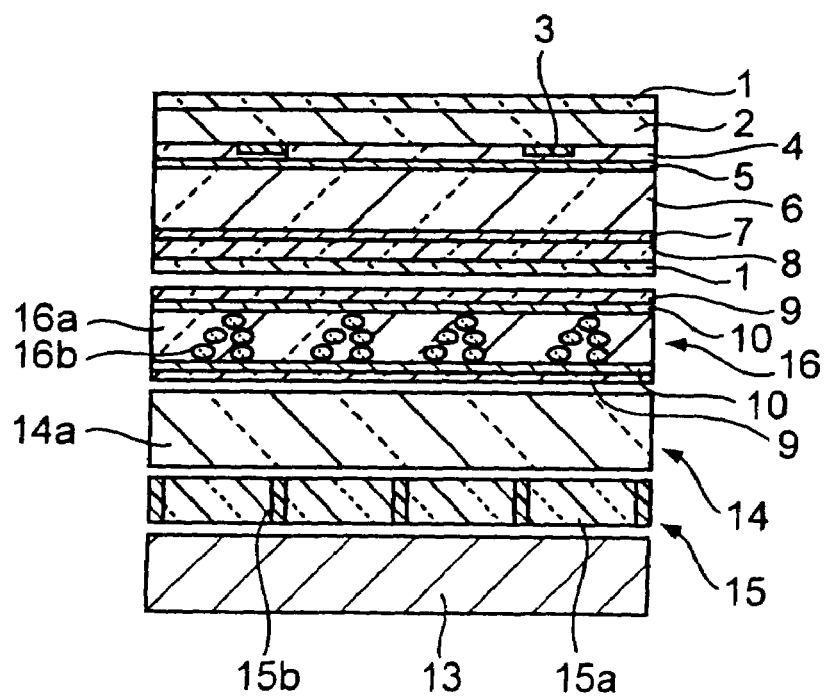
Figure 13:
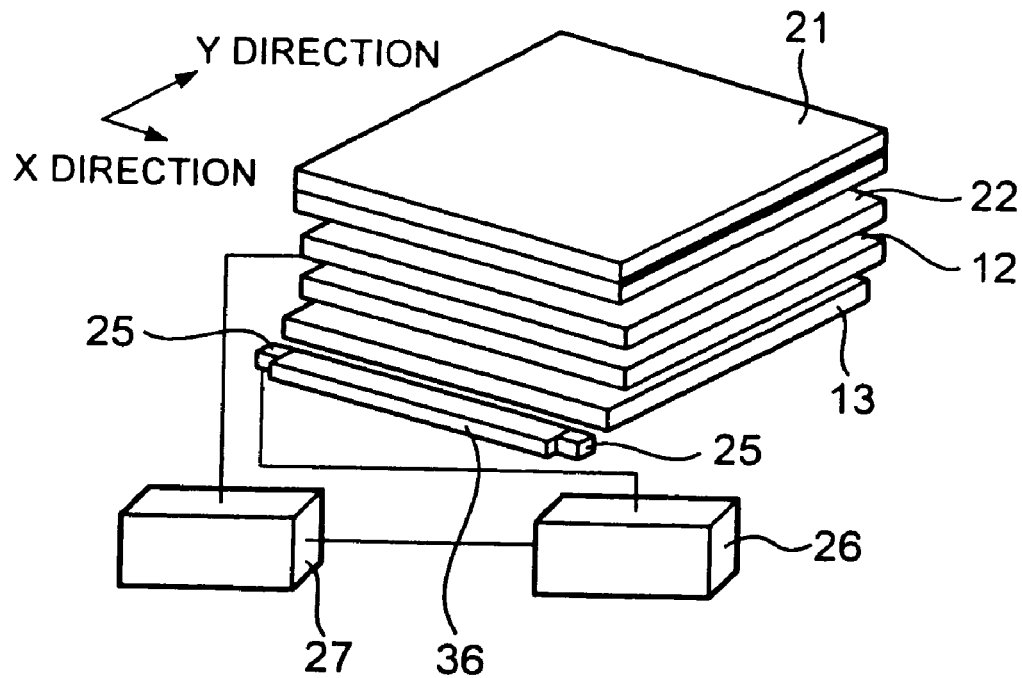
Figure 14:
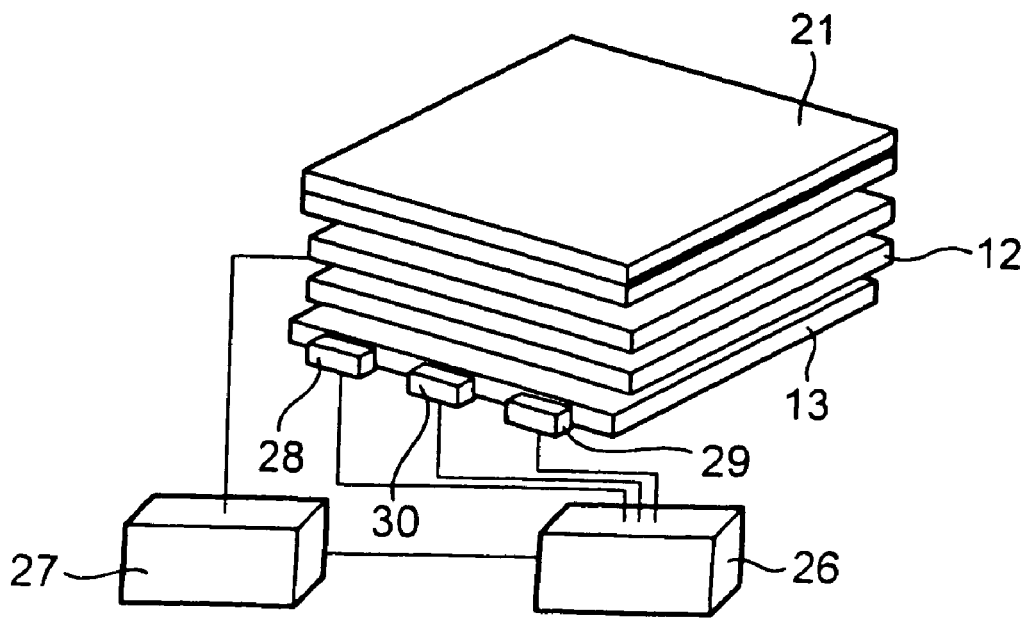
Figure 15:
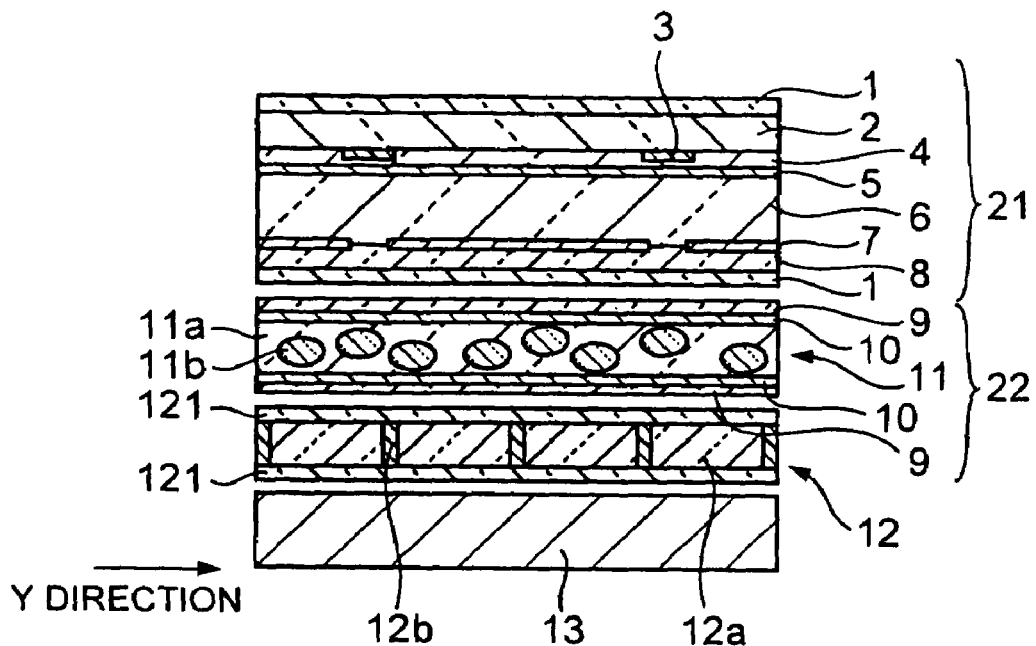
Figure 16:
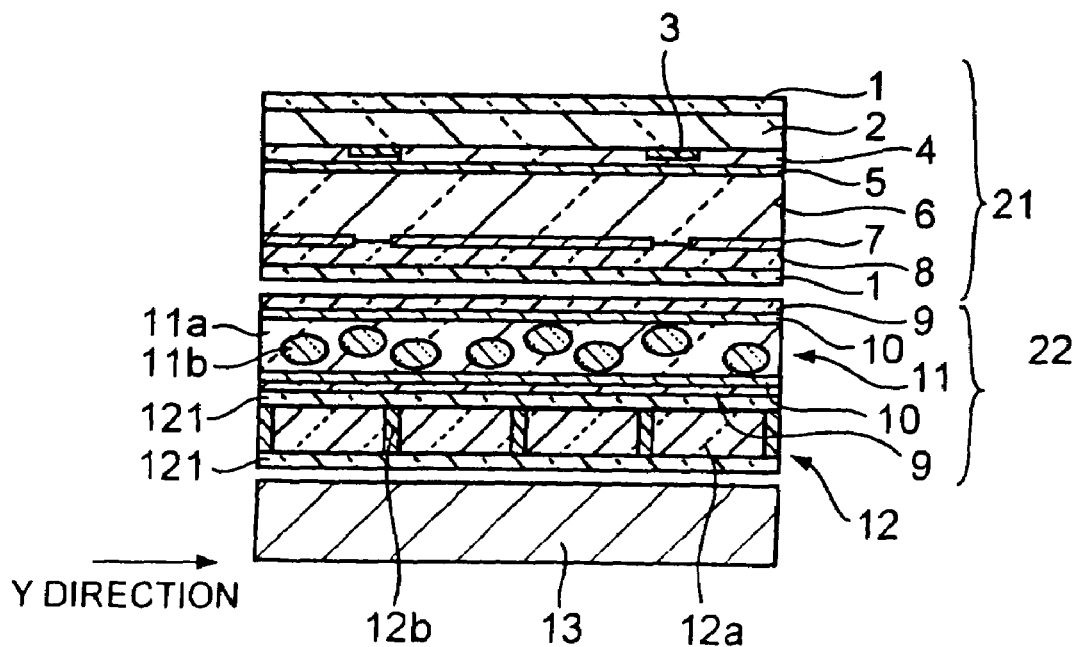
Figure 17:
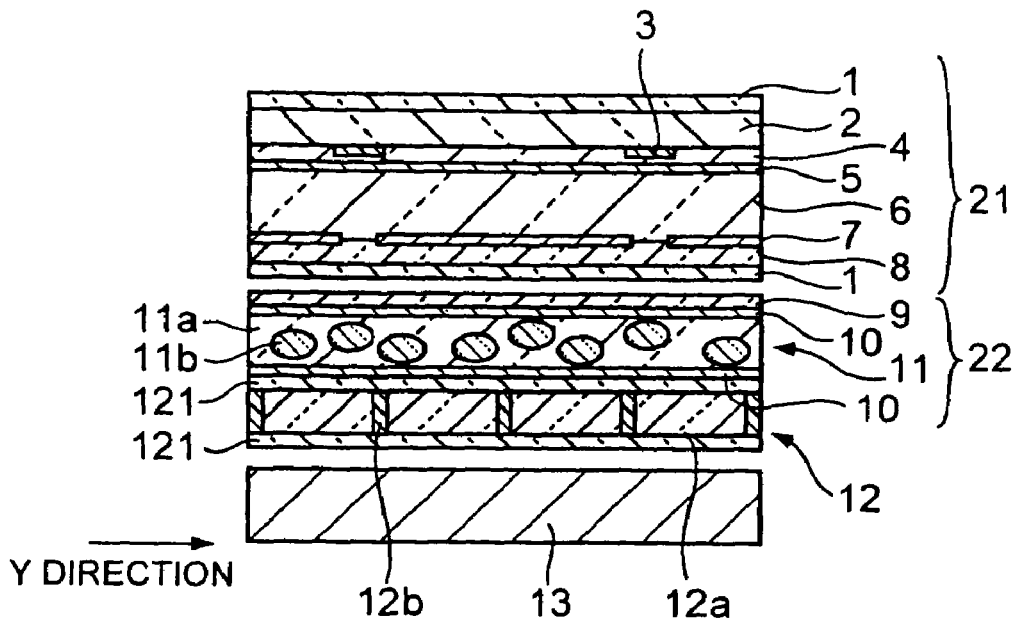
Figure 18:
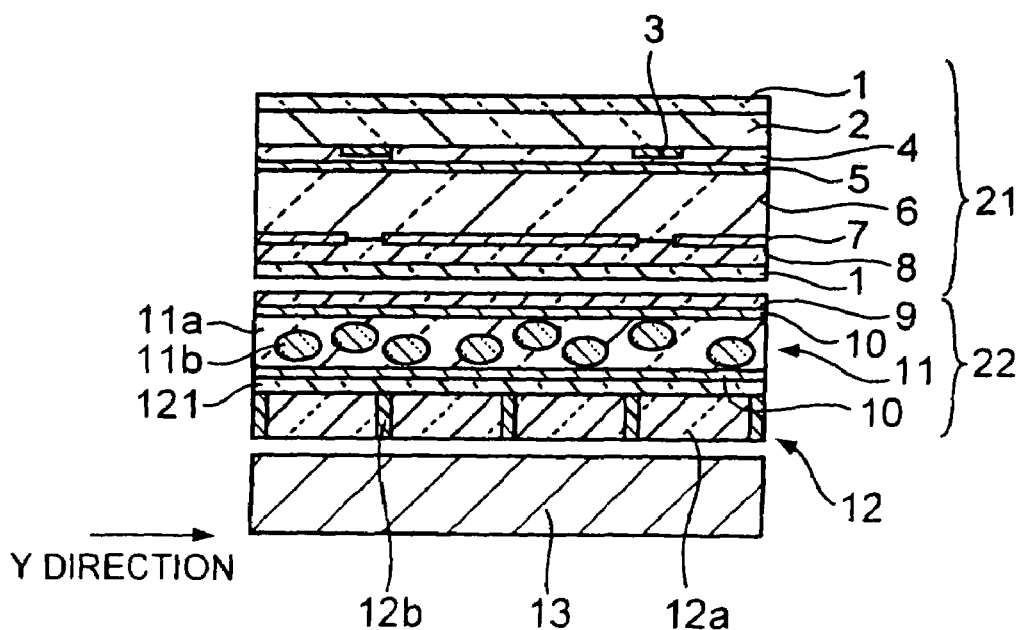
Figure 19:
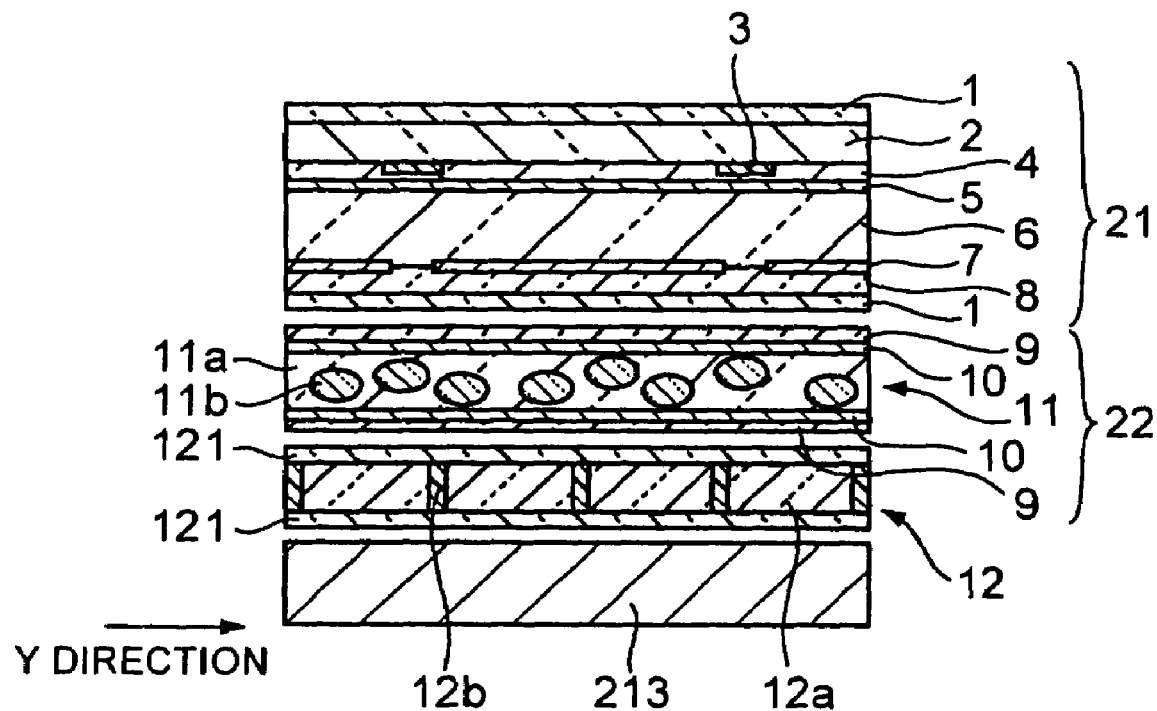
Figure 20:
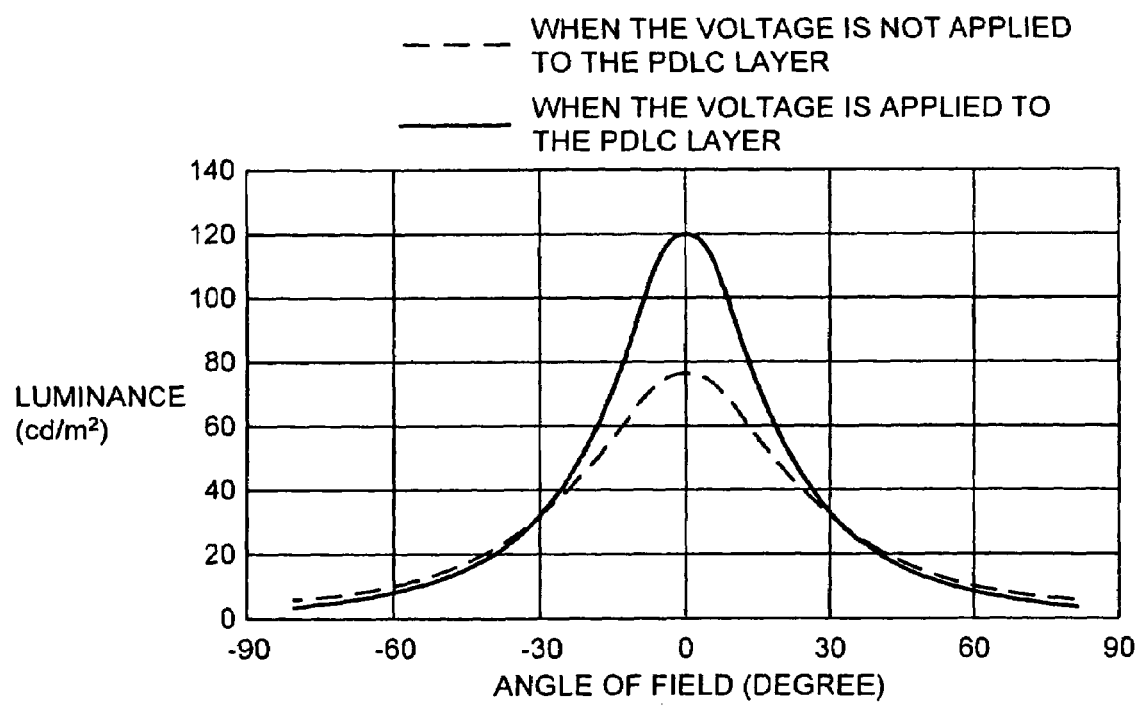
Figure 21:
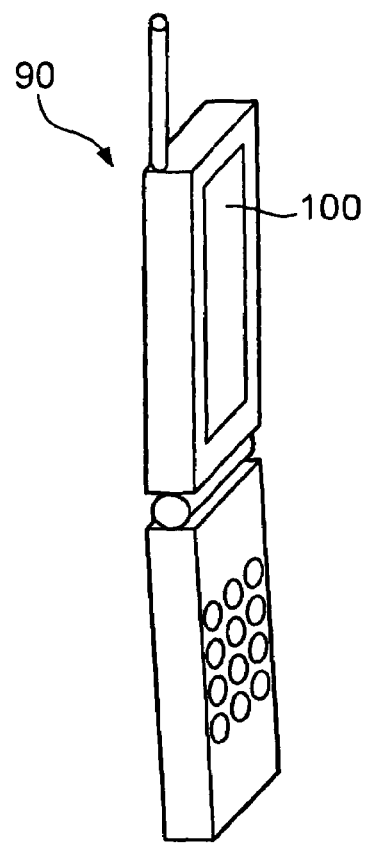
Figure 22:
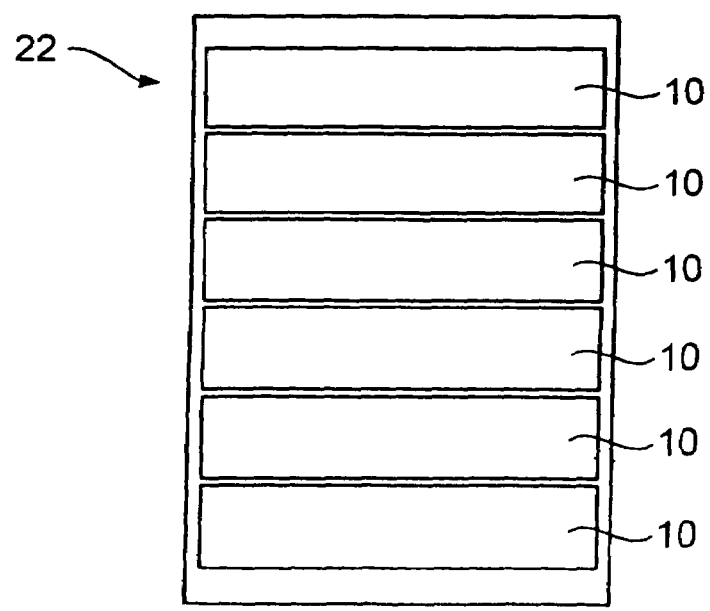
Figure 23:
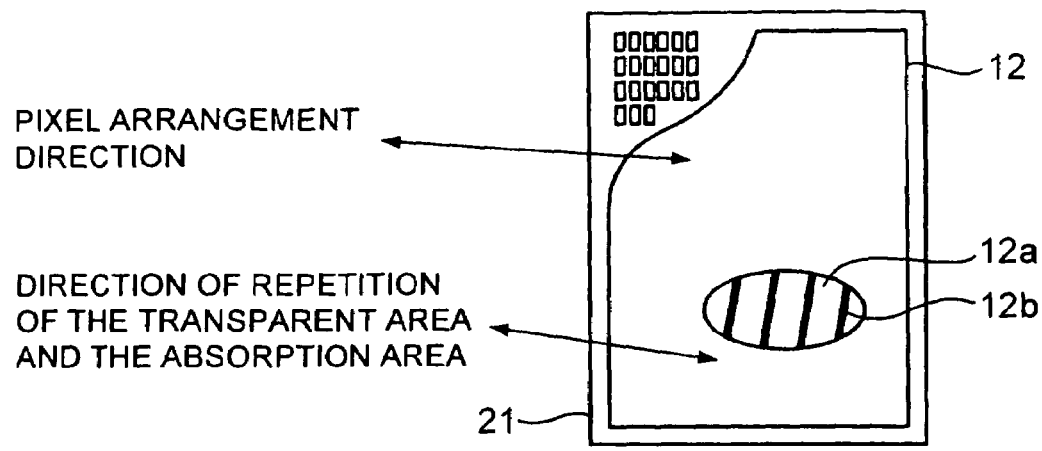
Figure 24A:
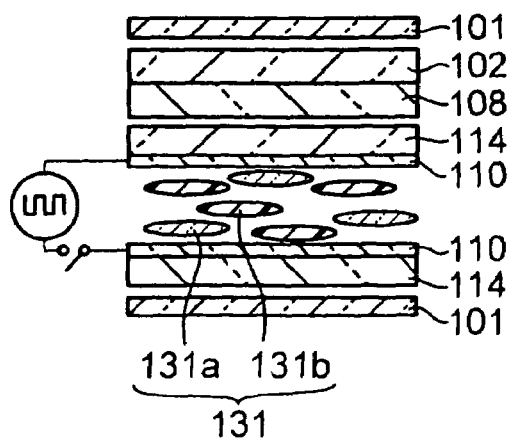
Figure 24B:
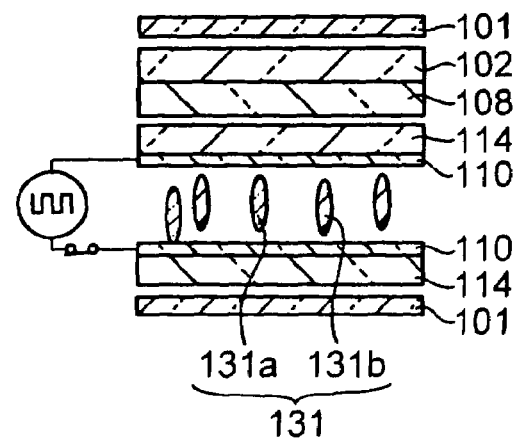
Figure 25:
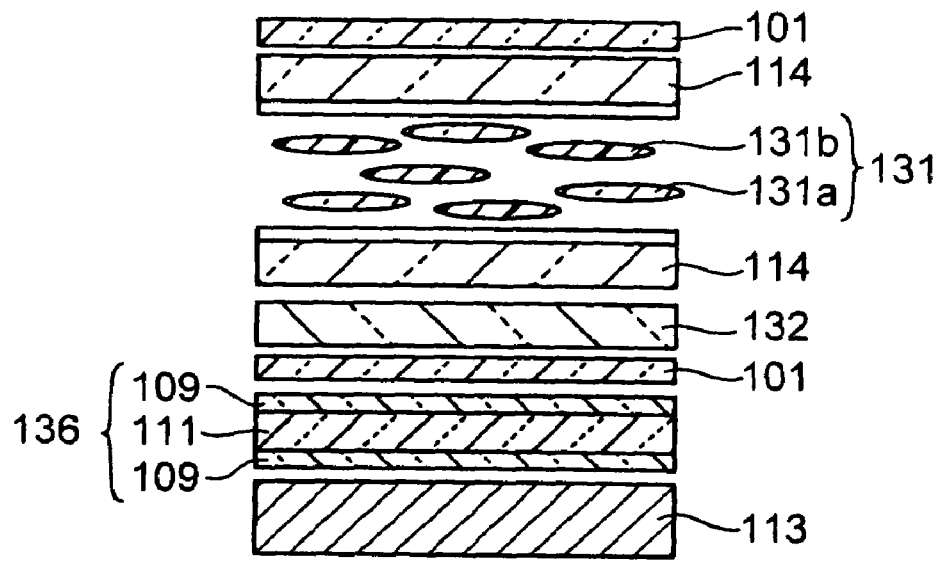
Figure 26:
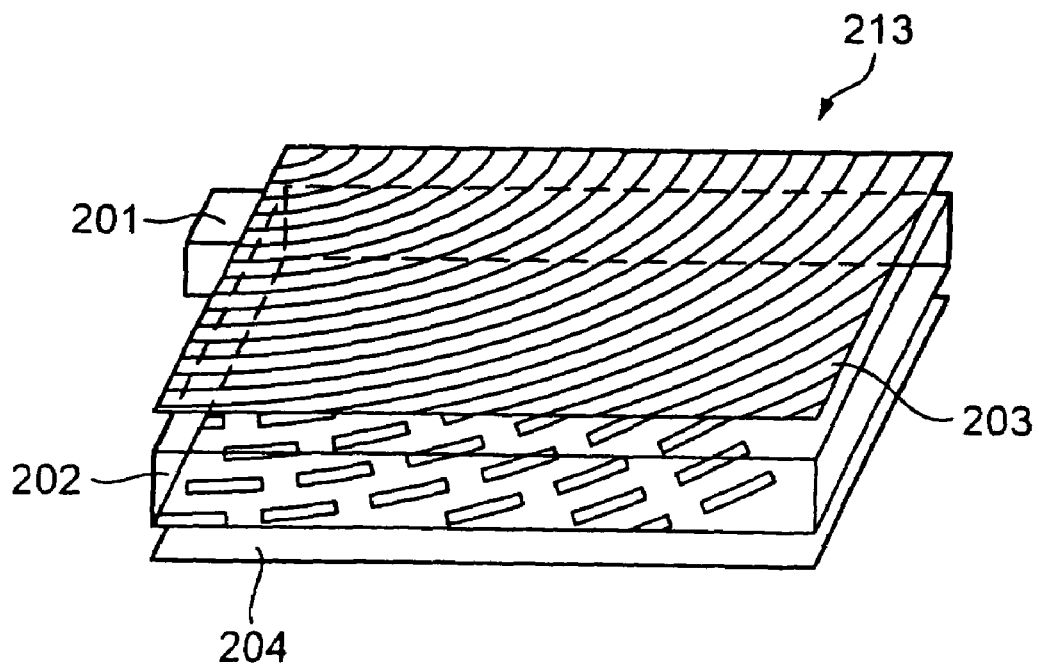

FIG. 1 is a sectional view showing a liquid crystal display device in accordance with a first embodiment of the invention;

FIG. 2 is a perspective view showing an example of a backlight that is used in the liquid crystal display device in accordance with the first embodiment of the invention;

FIG. 3 is a diagram showing a direction of light emitted from the backlight;

FIG. 4 is a plan view showing an example of a louver that is used in the liquid crystal display device in accordance with the first embodiment of the invention;

FIG. 5 is a diagram showing a light distribution characteristic at the time of a wide angle of field of the liquid crystal display device in accordance with the first embodiment of the invention;

FIG. 6 is a diagram showing a light distribution characteristic at the time of a narrow angle of field of the liquid crystal display device in accordance with the first embodiment;

FIG. 7 is a plan view showing an example of a louver that is used in a liquid crystal display device in accordance with a first modification of the first embodiment of the invention;

FIG. 8 is a plan view showing an example of a louver that is used in a liquid crystal display device in accordance with a second modification of the first embodiment of the invention;

FIG. 9 is a diagram showing a light distribution characteristic at the time of a wide angle of field of a liquid crystal display device in accordance with a third modification of the first embodiment of the invention;

FIG. 10 is a diagram showing a light distribution characteristic at the time of a narrow angle of field of the liquid crystal display device in accordance with the third modification of the first embodiment of the invention;

FIG. 11 is a sectional view showing a liquid crystal display device in accordance with a second embodiment of the invention;

FIG. 12 is a sectional view showing a liquid crystal display device in accordance with a third embodiment of the invention;

FIG. 13 is a sectional view showing a liquid crystal display device in accordance with a fourth embodiment of the invention;

FIG. 14 is a sectional view showing a liquid crystal display device in accordance with a fifth embodiment of the invention;

FIG. 15 is a sectional view showing a liquid crystal display device in accordance with a sixth embodiment of the invention;

FIG. 16 is a sectional view showing a liquid crystal display device in accordance with a seventh embodiment of the invention;

FIG. 17 is a sectional view showing a liquid crystal display device in accordance with an eighth embodiment of the invention;

FIG. 18 is a sectional view showing a liquid crystal display device in accordance with a ninth embodiment of the invention;

FIG. 19 is a sectional view showing a liquid crystal display device in accordance with a tenth embodiment of the invention;

FIG. 20 is a graph showing a result of an experiment in which a slight voltage is applied to a transparent and scattering switching element in a scattering state to adjust a scattering property;

FIG. 21 is a perspective view showing a portable terminal device mounted with a liquid crystal display device of the invention;

FIG. 22 is a plan view showing a transparent and scattering switching element of a liquid crystal display device in accordance with a twelfth embodiment of the invention;

FIG. 23 is a plan view showing a liquid crystal display device in which a direction in which a transparent area and an absorption area of a ray direction regulating element are formed alternately and a pixel arrangement direction of a liquid crystal display panel are not parallel to each other;

FIG. 24(a) is a diagram schematically showing a first conventional liquid crystal display device at the time when a voltage is not applied thereto;

FIG. 24(b) is a diagram schematically showing a first conventional liquid crystal display device at the time when a voltage is applied thereto;

FIG. 25 is a diagram schematically showing a second conventional liquid crystal display device; and FIG. 26 is a perspective view showing a conventional high directivity backlight.

DETAILED DESCRIPTION OF THE PREFERRED EMBODIMENTS

Best Mode for Carrying Out the Invention

Embodiments of the invention will be hereinafter explained specifically with reference to the accompanying drawings. First, a first embodiment of the invention will be explained. FIG. 1 is a sectional view showing a liquid crystal display device in accordance with the first embodiment. FIG. 2 is a perspective view showing an example of a backlight that is used in the liquid crystal display device in accordance with the first embodiment. FIG. 3 is a diagram showing a direction of light emitted from the backlight. FIG. 4 is a plan view showing an example of a louver that is used as a ray direction regulating element in the liquid crystal display device in accordance with the first embodiment. FIG. 5 is a diagram showing a light distribution characteristic at the time of a wide angle of field of the liquid crystal display device in accordance with the first embodiment. FIG. 6 is a diagram showing a light distribution characteristic at the time of a narrow angle of field of the liquid crystal display device.

As shown in FIG. 1, in the liquid crystal display device in accordance with the first embodiment, a backlight 13 is provided, and a louver 12 (a ray direction regulating element) is provided above the backlight 13. A transparent and scattering switching element 22 is provided above the louver 12, and a liquid crystal panel 21 is provided above the transparent and scattering switching element 22.

As shown in FIG. 2, a linear light source 36 of a prism shape is provided along one end face of the backlight 13, and white LEDs 25 are provided to be opposed to both ends thereof, respectively. The linear light source 36 includes plural prisms (not shown), which are arranged cyclically, to refract light, which is made incident on the linear light source 36 from the white LEDs 25, substantially orthogonally in a direction of the backlight 13 with the plural prisms. In this way, the linear light source 36 emits linear light in the direction of the backlight 13 from a side of the backlight 13. In addition, the backlight 13 includes plural prisms (not shown) that are arranged cyclically in a direction orthogonal to a surface extending in parallel to the linear light source 36 and opposed to the linear light source 36. These prisms refract linear light made incident from the linear light source 36 in a direction orthogonal to one surface 37 of the backlight 13 and emit planar light from the entire surface 37. Such a backlight 13 emits light, of which light in a direction parallel to the linear light source 36 has a wider angle than light in a direction orthogonal to the linear light source 36.

As shown in FIG. 3, a direction 35 of light emitted from the backlight 13 is defined by a polar angle $\theta$ and an azimuth $\phi$. The polar angle $\theta$ is an angle formed by the direction 35 and a direction 34 perpendicular to a surface of the backlight 13. On a projection surface 13 parallel to the backlight 13, when an X-Y rectangular coordinate with a point, where the direction 34 and the projection surface 33 cross each other, as an origin O is assumed, the azimuth $\phi$ is an angle formed by a line, which connects an intersection where the direction 35 and the projection surface 33 cross each other and the origin O, and the X axis. In this way, light emitted from the backlight 13 is diffused light, and $\theta$ and $\phi$ have wide distributions.

As shown in FIG. 1, the louver 12 is a ray direction regulating element that improves directivity of light emitted from the backlight 13. The louver 12 regulates a ray direction of broadening light made incident from the backlight 13 in one direction and emits the light. This light regulating direction is, for example, a direction perpendicular to a surface of the louver 12. Of the light emitted from the louver 12, directivity of light in a direction perpendicular to the surface of the louver 12 (light regulating direction) is improved. In this case, the light emitted with the direction thereof regulated by the louver 12 broadens a little, although a polar angle $\theta$ is smaller than that of the light emitted from the backlight 13 shown in FIG. 3.

In the louver 12, for example, a transparent area 12a, which transmits light, and an absorption area 12b, which absorbs light, are formed to be arranged alternately in a direction parallel to the surface of the louver 12. The direction in which the transparent area 12a and the absorption area 12b are arranged alternately is identical with, for example, a direction in which the backlight 13 emits wide angle light, that is, a direction parallel to the linear light source 36. As shown in FIG. 4, viewed from a direction perpendicular to the surface of the louver 12, the transparent area 12a and the absorption area 12b of a stripe shape are arranged alternately. The louver 12 can adjust, for example, thickness and an arrangement pitch of the transparent area 12a and the absorption area 12b and an absorption amount of light in the absorption area 12b to adjust an emission angle at the time when incident light is emitted.

As shown in FIG. 1, in the transparent and scattering switching element 22, a PDLC layer 11 formed by scattering liquid crystal molecules 11b in a polymer matrix 11a is put in electrodes 10, and a transparent substrate 9 is provided on the each electrode 10. A voltage is applied to the PDLC layer 11, which is sandwiched between the electrodes 10, by the electrodes 10, whereby an orientation state of liquid crystal molecules in the PDLC layer 11 changes. The PDLC layer 11 is formed by, for example, exposing a mixture of a photo-curing resin and a liquid crystal material to light and hardening the mixture. The transparent and scattering switching element 22 scatters or transmits light made incident from the louver 12 and emits the light to the liquid crystal panel 21.

In the liquid crystal panel 21, a polarizing panel 1, which polarizes light made incident from the transparent and scattering switching element 22, is provided, and a transparent substrate 8 is provided on the polarizing plate 1. A pixel electrode 7 defining a pixel area is provided on the transparent substrate 8 in a matrix shape. A liquid crystal layer 6 is provided to cover surfaces of the pixel electrode 7 and the transparent substrate 8. A common electrode 5 for applying a voltage to the liquid crystal layer 6 is provided on the liquid crystal layer 6, and the transparent dielectric layer 4 is provided on the common electrode 5. In the transparent dielectric layer 4, a groove is formed in a position corresponding to an area of the surface of the transparent substrate 8, which is not covered by the pixel electrode 7, and a black matrix 3, which prevents external light from being projected on the liquid crystal panel, is provided in the groove. A transparent substrate 2 is provided to cover the transparent dielectric layer 4 and the black matrix 3, and a polarizing plate 1, which polarizes emitted light from the liquid crystal panel, is provided on the transparent substrate 2.

As shown in FIG. 5, light emitted from the backlight 13 has an elliptical distribution 38 spreading widely in an X direction compared with a Y direction. This emitted light distribution indicates that light spreads largely as an area of a distribution area is larger. When light of this distribution 38 is made incident on the louver 12, light spreading in the X direction is absorbed by the louver 12 to change to light of a distribution 39 with high directivity that is distributed substantially in a round shape. In the case of the wide field of view display, when the light of this distribution 39 is made incident on the transparent and scattering switching element 22 in the scattering state, light of a circular distribution is uniformly scattered to change to light of a circular distribution 40 that spreads more largely. The light of this distribution 40 is transmitted through the liquid crystal panel 21 and emitted to realize the wide field of view display.

As shown in FIG. 6, when light of the distribution 38 emitted from the backlight 13 is made incident on the louver 12, light spreading in the X direction is absorbed by the louver 12 to change to light of the distribution 39 with high directivity that is distributed in substantially in a round shape. In the case of the narrow field of view display, when the light of this distribution 39 is made incident on the transparent and scattering switching element 22 in the transparent state, light of a circular distribution is transmitted through the transparent and scattering switching element 22 directly and light of the distribution 39 is emitted. The light of this distribution 39 is transmitted through the liquid crystal panel 21 and emitted to realize the narrow field of view display.

Next, an operation of the liquid crystal display device in accordance with the first embodiment formed as described above will be explained. First, a case of the wide field of view display will be explained. As shown in FIG. 1, light emitted from the backlight 13 is made incident on the louver 12. As shown in FIG. 3, light emitted from the backlight 13 is diffused light, and $\theta$ and $\phi$ have wide distributions. In the backlight 13 shown in FIG. 2, as shown in FIG. 5, light emitted from the backlight 13 has a larger value of $\theta$ in the case in which $\phi$ is close to 0 degree or 180 degrees than in the case in which $\phi$ is close to 90 degrees or 270 degrees. In other words, the light has the elliptical distribution 38 spreading widely in the X direction compared with the Y direction. When the light of this distribution 38 is made incident on the louver 12, light with large θ is absorbed by the absorption area 12b of the louver 12. Light with small θ is transmitted through the transparent area 11a. Therefore, in light emitted from the louver 12, the light with large θ is removed and light of the distribution 39 with a small distribution area and high directivity is emitted.

As shown in FIG. 1, the light of the distribution 39 with high directivity emitted from the louver 12 is made incident on the transparent and scattering switching element 22. In the case of the wide field of view display, a voltage is not applied to the PDLC layer 11. Consequently, the PDLC layer 11 is in a state in which the liquid crystal molecules 11b are scattered at random in the polymer matrix 11a, and the incident light is scattered. Therefore, as shown in FIG. 5, light of the circular distribution 39 is uniformly scattered by the PDLC layer 11 to change to light of the circular distribution 40 spreading more largely. In other words, the light, directivity of which is improved by the louver 12, is scattered by the transparent and scattering switching element 22 to have lower directivity and change to light with a wide angle. As shown in FIG. 1, the light of the distribution 40 spreading in a wide range is made incident on the liquid crystal panel 21 and emitted while keeping the distribution 40. In this way, an image is displayed in a wide angle of field.

Next, a case of the narrow field of view display will be explained. As shown in FIG. 6, as in the case of the wide field of view display, light having the elliptical distribution 38 emitted from the backlight 13 is changed to light of the distribution 39 with a small distribution area and high directivity by the louver 12.

As shown in FIG. 1, the light of the distribution 39 is made incident on the transparent and scattering switching element 22. In the case of the narrow field of view display, a predetermined voltage is applied to the PDLC layer 11. Consequently, the PDLC layer 11 comes into the transparent state in which the liquid crystal molecules 11b scattered in the polymer matrix 11a are oriented. In other words, the PDLC layer 11 transmits incident light directly. Therefore, as shown in FIG. 6, the light of the circular distribution 39 is transmitted through the PDLC layer 11 directly. In other words, the light, directivity of which is improved by the louver 12, is emitted from the transparent and scattering switching element 22 in a state of the distribution 39 keeping high directivity. As shown in FIG. 1, the light of the distribution 39 with high directivity is made incident on the liquid crystal panel 21 and emitted while keeping the distribution 39. In this way, an image is displayed at a narrow angle of field.

In this way, light with low directivity emitted from the backlight 13 is converted into light with high directivity by the louver 12, and the light with high directivity is transmitted or scattered by the transparent and scattering switching element, which uses the PDLC layer, to switch the narrow field of view display and the wide field of view display. Consequently, it is possible to increase a variable width of an irradiation angle of light in the planar light source and increase a variable width of an angle of field of the liquid crystal display device that uses the planar light source.

Here, the same liquid crystal display device as the first embodiment is constituted using the conventional prism sheet instead of the louver 12 to measure a relation between an angle of field and a luminance in the case of the narrow field of view display. A range of an angle of field of 0 degree, that is, an angle of field, at which a luminance of a value equal to or larger than half a luminance at the time when the liquid crystal display device is viewed from the front is obtained, is 30 degrees to the left and the right. On the other hand, in the first embodiment, a range of an angle of field, at which a luminance of a value equal to or larger than half a luminance at the angle of field 0 degree is obtained, is 20 degrees to the left and the right. In this way, in the first embodiment, it is possible to realize the narrow field of view display effectively compared with the conventional technique.

Next, a first modification of the first embodiment of the invention will be explained. FIG. 7 is a plan view showing an example of a louver that is used in a liquid crystal display device in accordance with the first modification of the first embodiment. In the first embodiment described above, as shown in FIG. 4, the transparent area 12a and the absorption area 12b of a stripe shape are arranged alternately on the surface of the louver 12 when the louver 12 is viewed from a direction perpendicular to the surface. Thus, directivity of light made incident on the louver 12 can be improved only in one direction. On the other hand, in the first modification of the first embodiment, as shown in FIG. 7, a circular transparent area 12a is arranged in the absorption area 12b in a matrix shape when the louver 12 is viewed from a direction perpendicular to the surface of the louver 12. Consequently, it is possible to improve directivity of light made incident on the louver 12 in various directions. Components, operations, and effects in the first modification of the first embodiment other than those described above are the same as those in the first embodiment.

Next, a second modification of the first embodiment will be explained. FIG. 8 is a plan view showing an example of a louver that is used in a liquid crystal display device in accordance with the second modification of the first embodiment. In the first modification of the first embodiment, as shown in FIG. 7, the circular transparent area 12a is arranged in the absorption area 12b in a matrix shape. On the other hand, in the second modification of the first embodiment, as shown in FIG. 8, a quadrangle transparent area 12a is arranged in the absorption area 12b in a matrix shape when the louver 12 is viewed from a direction perpendicular to the surface of the louver 12. The transparent area 12a is, for example, a square or a rectangle. Components, operations, and effects in the second modification of the first embodiment other than those described above are the same as those in the first modification of the first embodiment.

Next, a third modification of the first embodiment of the invention will be explained. FIG. 9 is a diagram showing a light distribution characteristic at the time of a wide angle of field of a liquid crystal display device in accordance with a third modification of the first embodiment. FIG. 10 is a diagram showing a light distribution characteristic at the time of a narrow angle of field.

In the first embodiment, as shown in FIG. 5, light emitted from the backlight 13 has the elliptical distribution 38 spreading in the X direction widely compared with the Y direction. When the light of this distribution 38 is made incident on the louver 12, the light spreading in the X direction is absorbed by the louver 12 to change to light of the distribution 39 with high directivity that is distributed substantially in a round shape. In the case of the wide field of view display, when the light of this distribution 39 is made incident on the transparent and scattering switching element 22 in the scattering state, light of a circular distribution is uniformly scattered to change to light of the circular distribution 40 spreading more largely. The light of this distribution 40 is transmitted through the liquid crystal panel 21 and emitted to realize the wide field of view display. In addition, as shown in FIG. 6, when light of the distribution 38 emitted from the backlight 13 is made incident on the louver 12, light spreading in the X direction is absorbed by the louver 12 to change to light of the distribution 39 with high directivity that is distributed substantially in a round shape. In the case of the narrow field of view display, when the light of this distribution 39 is made incident on the transparent and scattering switching element 22 in the transparent state, light of a circular distribution is transmitted through the transparent and scattering switching element 22 directly and light of the distribution 39 is emitted. The light of this distribution 39 is transmitted through the liquid crystal panel 21 and emitted to realize the narrow field of view display.

On the other hand, in the third modification of the first embodiment, as shown in FIG. 9, light emitted from the backlight 13 has an elliptical distribution 41 spreading widely in the Y direction compared with the X direction. When the light of this distribution 41 is made incident on the louver 12, directivity of light spreading in the X direction is further improved by the louver 12 and, in particular, light distributed in the X direction changes to light of a distribution 42 having high directivity. In the case of the wide field of view display, when the light of this distribution 42 is made incident on the transparent and scattering switching element 22 in the scattering state, the light scatters to spread in the X direction to change to light of a distribution 43. The light of this distribution 43 is transmitted through the liquid crystal panel 21 and emitted to realize the wide field of view display. In addition, as shown in FIG. 10, when the light of the distribution 41 emitted from the backlight 13 is made incident on the louver 12, directivity of light spreading in the X direction is further improved by the louver 12 and, in particular, light distributed in the X direction changes to light of the distribution 42 having high directivity. In the case of the narrow field of view display, when the light of this distribution 42 is made incident on the transparent and scattering element 22 in the transparent state, in particular, light of a distribution having high directivity of light distributed in the X direction is transmitted through the transparent and scattering switching element 22 directly and light of the distribution 42 is emitted. The light of this distribution 42 is transmitted through the liquid crystal panel 21 and emitted to realize the narrow field of view display with respect to the X direction.

In the third modification of the first embodiment, compared with the first embodiment, since an amount of light, which is emitted from the backlight 13 and absorbed by the louver 12, can be reduced, it is possible to realize bright wide field of view display. In particular, since an amount of light of the backlight 13 is limited, the third modification is effective in the case in which switching of an angle of field only in the X direction has to be realized. Components, operations, and effects in the third modification of the first embodiment other than those described above are the same as those in the first embodiment.

Next, a second embodiment of the invention will be explained. FIG. 11 is a sectional view showing a liquid crystal display device in accordance with the second embodiment. In the first embodiment described above, as shown in FIG. 1, the one louver 12, in which the transparent area 12a and the absorption area 12b of a stripe shape are arranged alternately, is provided between the backlight 13 and the transparent and scattering switching element 22. On the other hand, in the second embodiment, as shown in FIG. 11, a louver 15, in which a transparent area 15a and an absorption area 15b of a stripe shape are arranged alternately in one direction, and a louver 14, in which a transparent area 14a and an absorption area (not shown) of a stripe shape are arranged alternately in a direction orthogonal to an arrangement direction in the louver 15, are stacked to be provided between the backlight 13 and the transparent and scattering switching element 22. Consequently, in the second embodiment, it is possible to improve directivity of light made incident on the louver 12 not only in one direction but also in a direction orthogonal to the direction. Therefore, for example, it is possible to realize the narrow field of view display effectively not only in the horizontal direction but also in the vertical direction. Components, operations, and effects in the second embodiment other than those described above are the same as those in the first embodiment.

Next, a third embodiment of the invention will be explained. FIG. 12 is a sectional view showing a liquid crystal display device in accordance with the third embodiment. In the first embodiment described above, as shown in FIG. 1, the conventional PDLC layer 11, in which the liquid crystal molecules 11b are scattered uniformly in the polymer matrix 11a, is used as the planar transparent and scattering switching element 22. On the other hand, in the third embodiment, as shown in FIG. 12, a PDLC layer 16, which is modulated such that distribution of liquid crystal molecules 16b scattered in a polymer matrix 16a has unevenness cyclically, is used. In the modulated PDLC layer 16, for example, a portion where the liquid crystal molecules 11b are dense and a portion where the liquid crystal molecules 11b are sparse are repeated cyclically in one direction. The modulated PDLC layer 16 scatters incident light intensely in the direction in which the portion where the liquid crystal molecules 11b are dense and the portion where the liquid crystal molecules 11b are sparse are repeated cyclically. Consequently, it is possible to increase an angle of field in this direction.

It is possible to manufacture such a modulated PDLC layer 16 by using the same material as the conventional PDLC layer for a PDLC layer and subjecting the PDLC layer to exposure and photo-curing via a photo-mask. Light is irradiated on the PDLC layer before curing via a photo-mask on which a linear pattern is formed cyclically. A part irradiated by the light starts to harden. At this point, a concentration gradient of the liquid crystal molecules 16b occurs between a hardening area and a not-hardening area. After the PDLC layer is subjected to the exposure for a predetermined time via the photo-mask, the entire surface of the PDLC layer is exposed to light, whereby the modulated PDLC layer 16 is obtained. In this modulated PDLC layer 16, a mixture of two or more kinds of liquid crystal molecules with different sizes may be used as the liquid crystal molecules 16b. Components, operations, and effects in the third embodiment other than those described above are the same as those in the first embodiment.

Next, a fourth embodiment of the invention will be explained. FIG. 13 is a sectional view showing a liquid crystal display device in accordance with the fourth embodiment. In the fourth embodiment, as shown in FIG. 13, in addition to the structure of the liquid crystal display device in accordance with the first embodiment, the liquid crystal display device further includes a light source light intensity control unit 26 that controls an amount of an electric current to be supplied to a white LED 25 and adjusts an amount of light, that is, a luminance of the white LED 25 and a transparent and scattering switching element control unit 27 that switches ON and OFF of a voltage of the transparent and scattering switching element 22. The light source light intensity control unit 26 and the transparent and scattering switching element control unit 27 are constituted to be associated with each other. Components in the fourth embodiment other than those described above are the same as those in the first embodiment.

Next, operations of the liquid crystal display device in accordance with the fourth embodiment constituted as described above will be explained. As shown in FIG. 13, in the case of the wide field of view display, the transparent and scattering switching element control unit 27 does not apply a voltage to the transparent and scattering switching element 22. Consequently, light made incident on the transparent and scattering switching element 22 from the louver 12 is scattered. At this point, the light source light intensity control unit 26 supplies an electric current to the white LED 25 such that a front luminance, that is, a luminance at an angle of field of 0 degree of the liquid crystal panel 21 takes a predetermined value. In the case of the narrow field of view display, the transparent and scattering switching element control unit 27 applies a voltage to the transparent and scattering switching element 22. Consequently, light made incident on the transparent and scattering switching element 22 from the louver 12 is transmitted through the transparent and scattering switching element 22 directly. Therefore, when an amount of an electric current supplied to the white LED 25 is the same, that is, an amount of light emitted from the backlight 13 is the same, a front luminance of the liquid crystal panel 21 is excessively large. Thus, the amount of electric current supplied to the white LED 25 is adjusted such that the front luminance of the liquid crystal panel 21 in the case of the narrow field of view display takes as same value as that in the case of the wide field of view display. Consequently, in the fourth embodiment, the front luminance of the liquid crystal panel 21 is kept constant. Note that, in the case in which the white LED 25 is constituted by a blue LED and a yellow phosphor, an amount of light of the white LED 25 may be adjusted by pulse width modulation of an electric current. In the white LED 25 constituted by the blue LED and the yellow phosphor, the yellow phosphor is excited by a part of blue light emitted by the blue LED to emit yellow light, and the blue light and the yellow light are mixed to generate white light. When an amount of an electric current is adjusted such that the front luminance of the liquid crystal panel 21 in the case of the narrow field of view display takes a value equivalent to that in the case of the wide field of view display, since an emission ratio of the blue light and the yellow light fluctuates, chromaticity change of the liquid crystal panel 21 occurs. On the other hand, when an amount of light is adjusted by the pulse modulation, the adjustment of an amount of light is realized by adjusting a ratio of light emitting time, it is possible to control chromaticity change of the liquid crystal panel 21. Operations and effects in the fourth embodiment other than those described above are the same as those in the first embodiment.

Next, a fifth embodiment of the invention will be explained. FIG. 14 is a sectional view showing a liquid crystal display device in accordance with the fifth embodiment. In the fourth embodiment described above, as shown in FIG. 13, the white LED 25 and the linear light source 36 are used. On the other hand, in the fifth embodiment, as shown in FIG. 14, a light source, in which a red LED 28, a green LED 29, and a blue LED 30 are arranged linearly and cyclically, is used instead of the linear light source 36. The liquid crystal display device includes the light source light control unit 26 that controls amounts of electric currents to be supplied to the red LED 28, the green LED 29, and the blue LED 30 and adjusts amounts of lights, that is, luminances of the LEDs. Components in the fifth embodiment other than those described above are the same as those in the fourth embodiment.

Next, operations of the liquid crystal display device in accordance with the fifth embodiment constituted as described above will be explained. As shown in FIG. 14, lights emitted from the red LED 28, the green LED 29, and the blue LED 30 are made incident on the backlight 13. Red, green, and blue are three primary colors of light, and lights of these colors are superimposed to form white light. The backlight 13 converts incident light into planar light. In the case of the wide field of view display, this light is made incident on the transparent and scattering switching element 22 and scattered. At this point, since a degree of scattering of light depends on a wavelength of the light, light with a shorter wavelength is scattered more intensely and light with a longer wavelength is less likely to be scattered. In other words, blue light is likely to be scattered and red light is less likely to be scattered. Therefore, a display image at the time when the liquid crystal panel is viewed from the front is reddish.

Thus, when light is scattered by the transparent and scattering switching element 22, for example, an amount of an electric current supplied to the blue LED 30 is increased to intensify blue light that is likely to be scattered, and an amount of an electric current supplied to the red LED 28 is reduced to weaken red light that is less likely to be scattered. In this way, in the wide field of view display and the narrow field of view display, intensity of lights emitted by the red LED 28, the green LED 29, and the blue LED 30 are adjusted in association with presence or absence of application of a voltage to the transparent and scattering switching element 22, whereby a tint of a display image at the time when the liquid crystal panel is viewed from the front can be kept constant. Operations and effects in the fifth embodiment other than those described above are the same as those in the fourth embodiment.

Next, a sixth embodiment of the invention will be explained. FIG. 15 is a sectional view showing a liquid crystal display device in accordance with the sixth embodiment. In the sixth embodiment, in addition to the structure of the liquid crystal display device in accordance with the first embodiment, transparent substrates 121 are provided on both sides of the louver 12. In an example, a material of the transparent substrates 121 is polyethylene terephthalate. Components in the sixth embodiment other than those described above are the same as those in the first embodiment.

In the liquid crystal display device in accordance with the sixth embodiment constituted as described above, since the transparent substrates 121 are provided on both the sides of the louver 12, there is an effect that it is possible to improve resistance of the louver 12 against changes in temperature and humidity, and reliability of the liquid crystal display device is improved. Operations and effects in the sixth embodiment other than those described above are the same as those in the first embodiment. In addition, the sixth embodiment can also be applied to the second to the fifth embodiments.

Next, a seventh embodiment of the invention will be explained. FIG. 16 is a sectional view showing a liquid crystal display device in accordance with the seventh embodiment. Whereas the louver and the transparent and scattering switching element are fixed by a couple-face tape in the sixth embodiment, in the seventh embodiment, the louver 12 having the transparent substrates 121 on both the sides thereof and the transparent and scattering switching element 22 are bonded and, as a result, formed integrally. Components in the seventh embodiment other than those described above are the same as those in the sixth embodiment.

In the liquid crystal display device in accordance with the seventh embodiment constituted as described above, the transparent substrates 121 are provided on both the sides of the louver 12 and, in addition, the louver 12 and the transparent and scattering switching element 22 are formed integrally. Thus, it is possible to improve resistance of the louver 12 against changes in temperature and humidity and improve reliability of the liquid crystal display device. It is also possible to reduce thickness of the liquid crystal display device.

Operations and effects in the seventh embodiment other than those described above are the same as those in the sixth embodiment.

Next, an eighth embodiment of the invention will be explained. FIG. 17 is a sectional view showing a liquid crystal display device in accordance with the eighth embodiment. Compared with the structure of the liquid crystal display device in accordance with the seventh embodiment, the eighth embodiment is characterized in that the louver 12 and the transparent and scattering switching element 22 are integrally formed and have a common substrate. In this example, the louver 12 has the transparent substrates 121 on both the sides thereof, and the substrate 121 of the louver 12 is also used as a transparent substrate on the transparent and scattering switching element 22 side. Thus, the transparent and scattering switching element 22 does not have the transparent substrate 9 on the louver 12 side. Components in the eighth embodiment other than those described above are the same as those in the seventh embodiment.

As described above, in the liquid crystal display device in accordance with the eighth embodiment, it is possible not only to improve reliability as in the liquid crystal display device in accordance with the seventh embodiment but also to reduce thickness of the liquid crystal display device. In addition, since the number of substrates constituting the liquid crystal display device can be reduced, it is also possible to reduce weight of the liquid crystal display device. Operations and effects in the eighth embodiment other than those described above are the same as those in the seventh embodiment.

Next, a ninth embodiment of the invention will be explained. FIG. 18 is a sectional view showing a liquid crystal display device in accordance with the ninth embodiment. Compared with the structure of the liquid crystal display device in accordance with the eighth embodiment, in the ninth embodiment, the louver 12 has only the transparent substrate 121 common to the louver 12 and the transparent and scattering switching element 22 and does not have a transparent substrate on the backlight 13 side. Components in the ninth embodiment other than those described above are the same as those in the eighth embodiment.

In the liquid crystal display device in accordance with the ninth embodiment constituted as described above, since the transparent substrate on the backlight 13 side of the louver 12 is not provided, reliability is lower than the reliability of the liquid crystal display device in accordance with the eighth embodiment. However, since the transparent substrate 121 is set on the transparent and scattering switching element 22 side, it is possible to improve reliability compared with the first embodiment. In addition, compared with the liquid crystal display device in accordance with the eighth embodiment, in the ninth embodiment, since the transparent substrate of the louver 12 can be removed, it is possible to further reduce thickness and weight of the liquid crystal display device. Operations and effects in the ninth embodiment other than those described above are the same as those in the eighth embodiment.

Next, a tenth embodiment of the invention will be explained. FIG. 19 is a sectional view showing a liquid crystal display device in accordance with the tenth embodiment. Compared with the structure of the liquid crystal display device in accordance with the first embodiment, the liquid crystal display device in accordance with the tenth embodiment is different in that the high directivity backlight 213 described in the monthly magazine "Display" May 2004, pages 14 to 17 is used. Components in the tenth embodiment other than those described above are the same as those in the first embodiment.

In the liquid crystal display device according to the tenth embodiment constituted as described above, since the high directivity backlight 213 with directivity improved two-dimensionally on a light emitting surface thereof is used, it is possible to reduce a loss in absorption of light by the louver 12 and realize bright display. In addition, since the directivity of the backlight is two-dimensional, it is also possible to show an effect of switching of an angle of field concerning a direction orthogonal to the direction in which the transparent area and the absorption area of the louver 12 are arranged alternately. Note that the high directivity backlight suitably used in the embodiment is not limited to the high directivity backlight described in the monthly magazine "Display" May 2004, pages 14 to 17, and it is possible to apply any backlight to the liquid crystal display device as long as directivity thereof is improved two-dimensionally.

FIG. 20 is a graph showing a result of an experiment in which a slight voltage is applied to the transparent and scattering switching element 22 in the scattering state to adjust a scattering property in the liquid crystal display device in accordance with the tenth embodiment. In the graph, a horizontal axis indicates an angle of field and a vertical axis indicates a luminance. A result indicated by a broken line is a luminance distribution in the case in which a voltage is not applied to a PDLC layer constituting a transparent and scattering switching element, and a result indicated by a solid line is a luminance distribution in the case in which a slight voltage (in an example, 1 volt) is applied to the PDLC layer. Note that the slight voltage in this context means a small voltage compared with a voltage for bringing the transparent and scattering switching element into a transparent state. Whereas a front luminance (a luminance in a 0° direction) in the case in which a voltage is not applied to the PDLC layer is 75 cd/m$^2$, a front luminance in the case in which a slight voltage is applied is improved to 120 cd/m$^2$. On the other hand, in an oblique direction, more specifically, in a range from +25° to +80° or a range from −25° to −80°, although a luminance in the case in which a voltage is applied slightly falls, a degree of the fall in the voltage is extremely small, and a luminance of substantially the same degree as that in the case in which a voltage is not applied is secured. This indicates that it is possible to improve a luminance in a front direction significantly without decreasing the luminance in the oblique direction significantly by applying a slight voltage at the time of scattering of the transparent and scattering switching element to slightly decrease the scattering property. This result is effective in the case in which a front luminance falls in the wide field of view display, due to limited amount of light of the back light. Although the tenth embodiment is explained, the explanation is not limited to the tenth embodiment but is applicable to the other embodiments as well. Operations and effects in the tenth embodiment other than those described above are the same as those in the first embodiment.

Next, an eleventh embodiment of the invention will be explained. FIG. 21 is a perspective view showing a portable terminal device mounted with the liquid crystal display device of the invention. As shown in FIG. 21, a liquid crystal display device 100 of the invention is mounted on, for example, a cellular phone 90.

The liquid crystal display device of the invention can be applied to a portable device such as a cellular phone and makes it possible to perform display for switching an angle of field. In particular, in the case in which the liquid crystal display device of the invention is mounted on a cellular phone, a transparent area and an absorption area of a louver serving as a ray direction regulating element are arranged alternately at least in a lateral direction of the cellular phone, whereby it is possible to switch the wide field of view display and the narrow field of view display with respect to the lateral direction of the cellular phone. This makes it possible to prevent a peep by other people from the lateral direction in public transportation facilities and the like. Note that the portable device is not limited to the cellular phone, and it is possible to apply the liquid crystal display device to various portable terminal devices such as a Personal Digital Assistant (PDA), a game machine, a digital camera, and a digital video camera. Moreover, the portable device mounted with the liquid crystal display device of the invention may have a setting for changing amounts of a light source at the time of the wide field of view display and the narrow field of view display independently from each other and may be capable of setting light emitting ratios of the light source in both the cases. Consequently, a user can set an optimum angle of field according to an environment of use. Furthermore, the portable device may have means for detecting residual battery power and have control means that can automatically change an angle of field according to the detected residual battery power. As described above, in the liquid crystal display device of the invention, since an electric power can be reduced more at the time of narrow field of view display than at the time of the wide field of view display, it is possible to reduce power consumption by automatically changing the wide field of view display to the narrow field of view display when residual battery power is low and extend an operating time of the portable device.

Next, a twelfth embodiment of the invention will be explained. FIG. 22 is a plan view showing the transparent and scattering switching element 22 of a liquid crystal display device in accordance with the twelfth embodiment. Compared with the structure of the first embodiment, the twelfth embodiment is different in that at least one side of the electrodes 10 of the transparent and scattering switching element 22 is machined in a line shape. Components in the twelfth embodiment other than those described above are the same as those in the first embodiment.

In the liquid crystal display device in accordance with the twelfth embodiment constituted as described above, it is possible to perform switching of transparent and scattering partially in plane by applying different voltages to the electrodes 10 machined in a line shape of the transparent and scattering switching element 22. Consequently, for example, it is possible to change the transparent and scattering switching element 22 to transparent only for a portion where confidential information is displayed on the basis of image information displayed on the liquid crystal display device to perform the narrow field of view display. Note that a shape of the electrodes 10 of the transparent and scattering switching element 22 is not limited to the line shape but may be a block shape.

Consequently, it is possible to switch the narrow field of view display and the wide field of view display in a block shape. In addition, in the two transparent substrate arranged above and below the PDLC layer, the electrodes may be machined in a line shape, respectively, and arranged such that longitudinal directions thereof are orthogonal to each other. This makes it possible to perform passive matrix drive for the transparent and scattering switching element 22 and switch an angle of field of an arbitrary portion on a screen. Operations and effects in the twelfth embodiment other than those described above are the same as those in the first embodiment.

Note that, as the PDLC layer that is used in the respective embodiments and the respective modifications, a PDLC layer, which is in the scattering state when a voltage is not applied thereto and is in the transparent state at the time of voltage application. Consequently, the transparent and scattering switching element does not consume electric power when the transparent and scattering switching element is in a state in which the transparent and scattering switching element scatters incident light. Thus, since the electric power is allocated to the backlight power supply, it is possible to improve brightness of the planar light source at the time of the scattering state. However, a form of the PDLC layer is not limited to the above, and a PDLC layer, which is in the transparent state when a voltage is not applied thereto and in the scattering state at the time of voltage application, may be used. Such a PDLC layer is obtained by exposing a material to light to harden the material while applying a voltage thereto. Consequently, in the portable information terminal, it is unnecessary to apply a voltage to the PDLC layer and it is possible to control power consumption in the narrow field of view display that is used frequently.

In addition, cholesteric liquid crystal, ferroelectric liquid crystal, or the like may be used as the liquid crystal molecules used in the PDLC layer. The liquid crystal keeps an orientation state at the time when a voltage is applied thereto even if an applied voltage is turned OFF and has a memory property. It is possible to reduce power consumption by using such a PDLC layer.

As shown in FIG. 23, a direction in which the transparent area and the absorption area of the ray direction regulating element and a pixel arrangement direction of the liquid crystal display panel may be not parallel to each other. Consequently, it is possible to reduce moiré due to the ray direction regulating element and the display panel and improve an image quality of the liquid crystal display device.

The display panel, which is used in combination with the planar light source of the invention, is not limited to the transparent liquid crystal panel. Any display panel may be used as long as the display panel uses a backlight. In particular, it is possible to use a liquid crystal panel with less dependency on an angle of field suitably. As an example of a mode of such a liquid crystal panel, in a lateral electric field mode, there are an IPS (In-Plane Switching) system, an FFS (Fringe Field Switching) system, an AFFS (Advanced Fringe Field Switching) system, and the like. In addition, in a vertical orientation mode, there are an MVA (Multi-domain Vertical Alignment) system, a PVA (Patterned Vertical Alignment) system, an ASV (Advanced Super V) system, and the like in which a liquid crystal panel is multi-domained to reduce dependency on an angle of field. It is also possible to use the invention in a liquid crystal display panel of a film compensation TN mode suitably. By using these liquid crystal panels with less dependency on an angle of field, it is possible to control tone reversal of display when the transparent and scattering switching element is in the scattering state and improve visibility. In addition, the liquid crystal panel is not limited to the transmission liquid crystal panel, and any panel may be used as long as the panel has a transmission area in each pixel. It is also possible to use a semi-transmission liquid crystal panel, a micro-transmission liquid crystal panel, and a micro-reflection liquid crystal panel that have a reflection area in a part of each pixel. Note that the reflection area does not always need to have reduced dependency on an angle of field, and only the transmission area may have reduced dependency on an angle of field.

What is claimed is:

1. A planar light source comprising:
   a backlight that emits light in a planar shape;
   a ray direction regulating element that regulates a direction of light made incident from the backlight and emits the light, whereby a directivity of the light is improved, said ray direction regulating element comprising a transparent area for transmitting light and an absorption area for absorbing light are formed alternately in a direction parallel to a surface of the ray direction regulating element; and
   a transparent and scattering switching element that is switchable between a state in which light which is transmitted by the ray direction regulating element and made incident on said switching element is transmitted and a state in which the light is scattered;
   wherein light emitted by the backlight spreads radially in an elliptical shape with respect to a direction perpendicular to an emission surface of said backlight, and
   wherein the transparent area and the absorption area of the ray direction regulating element are formed alternately in a direction parallel to a short diameter direction of the elliptical shape.

2. The planar light source according to claim 1, wherein, in the ray direction regulating element, the transparent area is provided in the absorption area in a matrix shape in a direction perpendicular to a surface of the ray direction regulating element.

3. The planar light source according to claim 2, wherein a shape of the transparent area comprises one of a circular shape, elliptical shape, square shape, and rectangular shape in a direction perpendicular to a surface of the ray direction regulating element.

4. The planar light source according to claim 1, wherein the ray direction regulating element has a first layer in which the transparent area and the absorption area are formed alternately and a second layer in which the transparent area and the absorption area are formed alternately in a direction perpendicular to the first layer.

5. The planar light source according to claim 1, wherein the transparent and scattering switching element and the ray direction regulating element are formed integrally.

6. The planar light source according to claim 5, wherein the transparent and scattering switching element and the ray direction regulating element have a common substrate.

7. The planar light source according to claim 6, wherein a substrate of the ray direction regulating element is only a substrate common to the ray direction regulating element and the transparent and scattering switching element.

8. The planar light source according to claim 1, wherein the transparent and scattering switching element comprises a polymer dispersed liquid crystal layer formed between a pair of electrodes and is in the state in which the transparent and scattering switching element scatters incident light when a voltage is not applied between the flat electrodes, and
   wherein a voltage is applied to the transparent and scattering switching element when the transparent and scattering switching element is used in the transparent state.

9. The planar light source according to claim 1, further comprising:
   a linear light source formed on a first side of said backlight for emitting light which is incident on said first side of said backlight,
   wherein said transparent area comprises plural first stripe portions and said absorption area comprises plural second stripe portions which are alternately formed and extend between said first side of said backlight and a second side of said backlight which is opposite said first side.

10. The planar light source according to claim 1, wherein said transparent and scattering switching element comprises scattering liquid crystal molecules formed in a polymer matrix.

11. A display device comprising:
    a backlight that emits light in a planar shape;
    a ray direction regulating element that regulates a direction of light made incident from the backlight and emits the light, whereby a directivity of the light is improved, said ray direction regulating element comprising a transparent area for transmitting light and an absorption area for absorbing light which are formed alternately in a direction parallel to a surface of the ray direction regulating element;
    a transparent and scattering switching element that is switchable between a state in which light which is transmitted by the ray direction regulating element and made incident on said switching element is transmitted and a state in which the light is scattered; and
    a liquid crystal panel that displays an image with light made incident from the transparent and scattering switching element, and
    wherein light emitted by the backlight spreads radially in an elliptical shape with respect to a direction perpendicular to an emission surface of said backlight, and
    wherein in the ray direction regulating element, the transparent area and the absorption area are formed alternately in a direction parallel to a short long diameter direction of the elliptical shape.

12. The display device according to claim 11, wherein, in the ray direction regulating element, the transparent area is provided in the absorption area in a matrix shape in a direction perpendicular to a surface of the ray direction regulating element.

13. The display device according to claim 12, wherein a shape of the transparent area comprises one of a circular shape, elliptical shape, square shape, and rectangular shape in a direction perpendicular to a surface of the ray direction regulating element.

14. The display device according to claim 11, wherein the ray direction regulating element has a first layer in which the transparent area and the absorption area are formed alternately and a second layer in which the transparent area and the absorption area are formed alternately in a direction perpendicular to the first layer.

15. A portable terminal device, comprising:
    the planar light source according to claim 1,
    wherein the transparent area and the absorption area of the ray direction regulating element are formed alternately in a lateral direction of the portable terminal device.

16. A ray direction switching element for a planar light source including a backlight, comprising:
    a ray direction regulating element for regulating a direction of incident light and emitting light, whereby a directivity of the light is improved, said ray direction regulating element comprising a transparent area for transmitting light and an absorption area for absorbing light which are formed alternately in a direction parallel to a surface of the ray direction regulating element; and
    a transparent and scattering switching element for switching a state in which light made incident from the ray direction regulating element is transmitted and a state in which the light is scattered, wherein said ray direction regulating element and said transparent and scattering switching element are integrally formed, wherein the incident light spreads radially in an elliptical shape with respect to an incident surface of said backlight, and wherein the transparent area for transmitting light and the absorption area for absorbing light are formed alternately in a direction parallel to a short diameter direction of the elliptical shape.

17. The ray direction switching element according to claim 16, wherein the transparent and scattering switching element and the ray direction regulating element are formed on a common substrate.

18. The ray direction switching element according to claim 17, wherein a substrate of the ray direction regulating element comprises a substrate common only to the ray direction regulating element and the transparent and scattering switching element.

* * * * *